United States Patent
Inaba et al.

(10) Patent No.: US 11,904,896 B2
(45) Date of Patent: Feb. 20, 2024

(54) VEHICLE CONTROL DEVICE FOR AUTONOMOUS VEHICLE OPERATION

(71) Applicant: HITACHI ASTEMO, LTD., Ibaraki (JP)

(72) Inventors: Ryoh Inaba, Tokyo (JP); Toshiharu Sugawara, Tokyo (JP); Hidehiro Toyoda, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 439 days.

(21) Appl. No.: 17/290,835

(22) PCT Filed: Nov. 20, 2019

(86) PCT No.: PCT/JP2019/045358
§ 371 (c)(1),
(2) Date: May 3, 2021

(87) PCT Pub. No.: WO2020/116156
PCT Pub. Date: Jun. 11, 2020

(65) Prior Publication Data
US 2022/0001895 A1    Jan. 6, 2022

(30) Foreign Application Priority Data

Dec. 3, 2018  (JP) .................................. 2018-226643

(51) Int. Cl.
*B60W 60/00* (2020.01)
*B60W 40/09* (2012.01)
*B60W 50/14* (2020.01)

(52) U.S. Cl.
CPC ........ *B60W 60/0016* (2020.02); *B60W 40/09* (2013.01); *B60W 50/14* (2013.01); *B60W 60/0013* (2020.02); *B60W 2050/143* (2013.01)

(58) Field of Classification Search
None
See application file for complete search history.

(56) References Cited

U.S. PATENT DOCUMENTS

| | | | |
|---|---|---|---|
| 2016/0132055 A1 | 5/2016 | Matsuno et al. | |
| 2017/0057510 A1* | 3/2017 | Herbach | B60W 30/181 |
| 2017/0364070 A1 | 12/2017 | Oba | |
| 2018/0088574 A1* | 3/2018 | Latotzki | G05D 1/0251 |

(Continued)

FOREIGN PATENT DOCUMENTS

| | | |
|---|---|---|
| JP | 2016-088383 A | 5/2016 |
| JP | 2016-115356 A | 6/2016 |

(Continued)

*Primary Examiner* — Brian P Sweeney
*Assistant Examiner* — Andrew Sang Kim
(74) *Attorney, Agent, or Firm* — Volpe Koenig

(57) ABSTRACT

Provided is a vehicle control device that can ensure riding comfort or safety. A vehicle control device includes a driving plan calculation unit that calculates a drivable area, which is a space in which an own vehicle is safely drivable, based on a driving environment around the own vehicle and a destination of the own vehicle; and a vehicle motion control unit that calculates a target track including a route and a velocity satisfying a predetermined riding comfort condition in the drivable area calculated by the driving plan calculation unit and controls the own vehicle so as to follow the target track.

10 Claims, 21 Drawing Sheets

(56) References Cited

U.S. PATENT DOCUMENTS

| | | | |
|---|---|---|---|
| 2019/0185018 A1* | 6/2019 | Tao | B60W 50/14 |
| 2019/0250617 A1* | 8/2019 | Ford | G05D 1/0212 |
| 2019/0317512 A1* | 10/2019 | Zhang | G05D 1/0238 |
| 2019/0369616 A1* | 12/2019 | Ostafew | B60W 60/00274 |
| 2019/0376799 A1 | 12/2019 | Inada et al. | |
| 2020/0139959 A1* | 5/2020 | Akella | B60W 60/0015 |

FOREIGN PATENT DOCUMENTS

| | | |
|---|---|---|
| JP | 2016-149109 A | 8/2016 |
| JP | 2018-062261 A | 4/2018 |
| JP | 2018-084869 A | 5/2018 |

\* cited by examiner

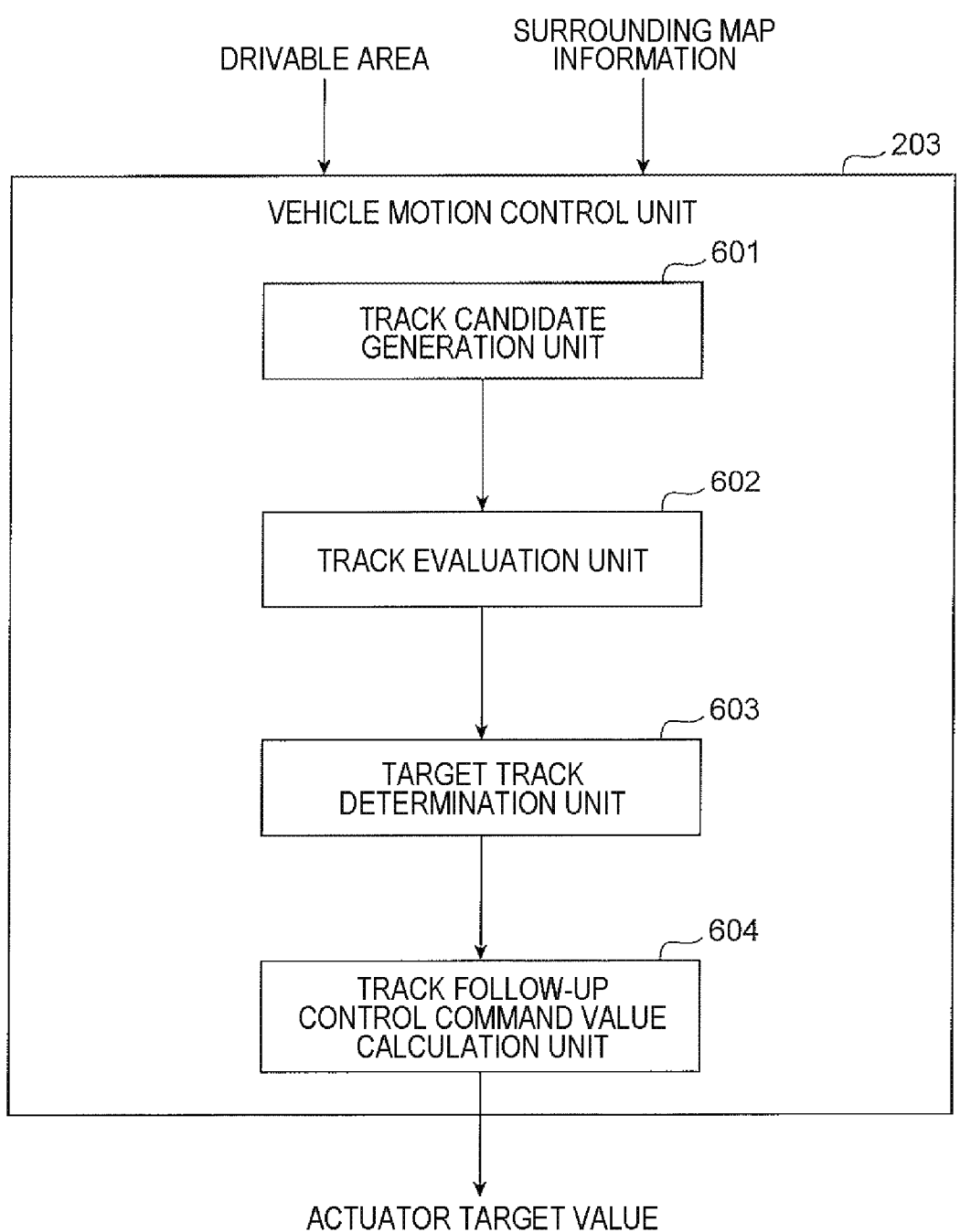

VEHICLE CONTROL DEVICE FOR AUTONOMOUS VEHICLE OPERATION

TECHNICAL FIELD

The present invention relates to a vehicle control device for controlling a vehicle such as an automobile, particularly a vehicle having a target track generation function and a follow-up control function during automatic traveling.

BACKGROUND ART

Conventionally, a system that acquires object information around an own vehicle, plans a driving behavior of the own vehicle based on the acquired object information and map information, generates a track based on the planned driving behavior, and controls the own vehicle so as to follow the track has been developed (see, for example, PTL 1 below).

CITATION LIST

Patent Literature

PTL 1: JP 2018-62261 A

SUMMARY OF INVENTION

Technical Problem

However, when a calculation unit that generates a traveling track of automatic driving and a calculation unit that controls a motion of a vehicle based on the traveling track result are implemented in different hardware, there are the following problems.

That is, for example, as described in PTL 1, when track point sequence information is used as a communication interface between different hardware, if a driving state (traveling state) of the vehicle is controlled only from the track point sequence information, riding comfort may decrease when it is not possible to drive (travel) along the track point sequence information due to slippage or the like depending on a road surface condition or a vehicle state.

In addition, for example, when a failure occurs in a power supply of a controller mounted with automatic driving control, if the automatic driving control is mounted on a single controller, it is difficult to ensure safety or riding comfort because only actions such as emergency stop can be performed.

The present invention has been made in view of the above circumstances, and an object of the present invention is to provide a vehicle control device capable of ensuring riding comfort or safety.

Solution to Problem

In order to solve the above problems, a vehicle control device according to the present invention includes a driving plan calculation unit that calculates a drivable area, which is a space in which an own vehicle is safely drivable, based on a driving environment around the own vehicle and a destination of the own vehicle; and a vehicle motion control unit that calculates a target track including a route and a velocity satisfying a predetermined riding comfort condition in the drivable area calculated by the driving plan calculation unit and controls the own vehicle so as to follow the target track.

Advantageous Effects of Invention

According to the present invention, since the frequency of acceleration/deceleration of the own vehicle is reduced by stabilizing track follow-up control of the own vehicle, it is possible to prevent the riding comfort from deteriorating. In addition, by mounting the automatic driving system on a plurality of controllers, even if the failure occurs in one controller, the other controllers can safely drive (travel/stop).

The problems, configurations, and effects other than those described above are clarified from the description of the following embodiments.

BRIEF DESCRIPTION OF DRAWINGS

FIGS. 4A-4B is an explanatory diagram illustrating a drivable area, in which FIG. 4A is a schematic diagram of an automatic driving traveling scene, and FIG. 4B is a schematic diagram of a drivable area and a non-drivable area of the scene illustrated in FIG. 4A.

FIGS. 5A-5B is an explanatory diagram illustrating a drivable area, in which FIG. 5A is a schematic diagram of an automatic driving traveling scene, and FIG. 5B is a schematic diagram of a drivable area and a non-drivable area of the scene illustrated in FIG. 5A.

FIG. 6 is a block diagram illustrating a configuration of a vehicle motion control unit of the vehicle control device according to the first embodiment of the present invention.

DESCRIPTION OF EMBODIMENTS

Hereinafter, embodiments of the present invention will be described in detail with reference to the drawings.

First Embodiment

Figure 1:
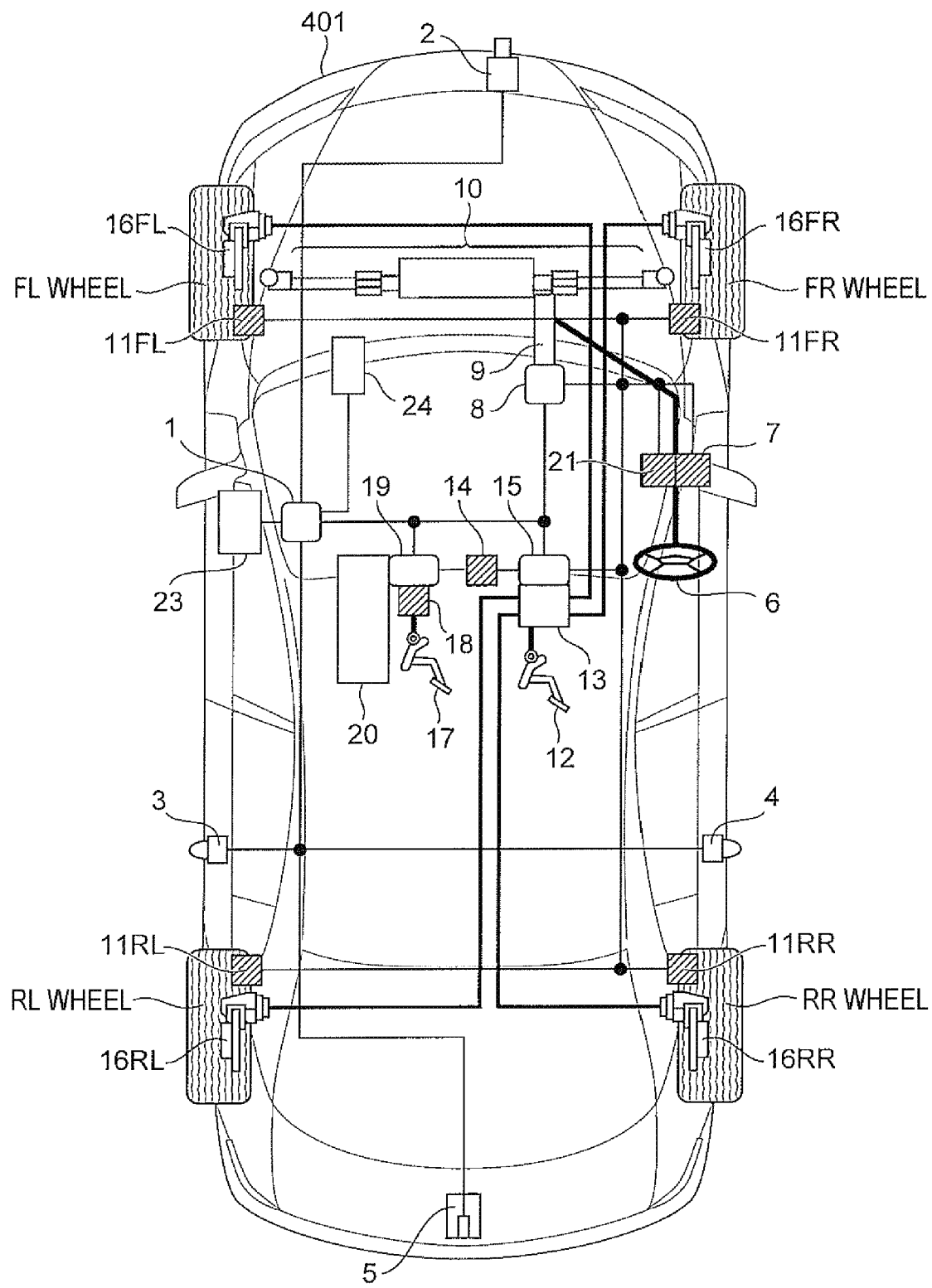
FIG. 1 is a block diagram illustrating a configuration of a traveling drive system and a sensor of an automatic driving vehicle mounted with a vehicle control device according to a first embodiment of the present invention.

FIG. 1 is an explanatory diagram illustrating an overall configuration of an automatic driving vehicle (hereinafter, may be simply referred to as a vehicle or own vehicle) 401 mounted with a vehicle control device 1 according to a first embodiment of the present invention. Note that in the figure, an FL wheel means a left front wheel, an FR wheel means a right front wheel, an RL wheel means a left rear wheel, and an RR wheel means a right rear wheel.

The vehicle 401 of the illustrated embodiment includes a vehicle control device 1 for calculating command values to a steering control mechanism 10, a brake control mechanism 13, and a throttle control mechanism 20 as actuators that control a traveling direction of the vehicle 401 based on information of sensors 2, 3, 4, and 5 that recognize the outside world. In addition, the vehicle 401 includes a steering control device 8 that controls the steering control mechanism 10 based on the command value from the vehicle control device 1, a braking control device 15 that controls the brake control mechanism 13 based on the command value to adjust a brake force distribution of each wheel (FL wheel, FR wheel, RL wheel, and RR wheel), an acceleration control device 19 that controls the throttle control mechanism 20 based on the command value to adjust a torque output of an engine (not illustrated), and a display device 24 that displays a traveling plan of the own vehicle 401 or a behavior prediction of moving objects existing in the vicinity. Note that in the present example, the engine is used as a drive source, but the present invention can be applied to an electric vehicle using a motor as the drive source.

The vehicle 401 includes a camera 2 on the front, laser radars 3 and 4 on the left and right sides, and a millimeter-wave radar 5 on the rear as sensors 2, 3, 4, and 5 that recognize the outside world, and can detect a relative distance and a relative velocity between the own vehicle 401 and the surrounding vehicles. In addition, the vehicle 401 includes a communication device 23 for communicating between road vehicles or between vehicles. Note that in the present embodiment, a combination of the above-mentioned sensors is illustrated as an example of the sensor configuration, but the example of the sensor configuration is not limited thereto, and may be a combination with an ultrasonic sensor, a stereo camera, an infrared camera, or the like. The sensor signal (sensor output signal) is input to the vehicle control device 1.

The vehicle control device 1, which is not illustrated in detail in FIG. 1, includes, for example, a CPU, a ROM, a RAM, and an input/output device. The ROM stores a flow of vehicle traveling control described below. Although the details will be described later, the vehicle control device 1 calculates the command values of the actuators 10, 13 and 20 for controlling the vehicle traveling according to the generated traveling plan. The control devices 8, 15 and 19 of the actuators 10, 13, and 20 receive the command value of the vehicle control device 1 by communication and control the actuators 10, 13, and 20 based on the command value.

Next, an operation of the brake will be described. When the driver is driving the vehicle 401, a pedaling force that a driver steps on a brake pedal 12 is boosted by a brake booster (not illustrated), and a master cylinder (not illustrated) generates hydraulic control according to the force. The generated hydraulic pressure is supplied to wheel cylinders 16FL to 16RR via the brake control mechanism 13. The wheel cylinders 16FL to 16RR are configured by cylinders, pistons, pads, and the like (not illustrated), the piston is propelled by a working fluid supplied from the master cylinder, and the pad connected to the piston is pressed against a disc rotor. The disc rotor rotates together with the wheels. Therefore, the braking torque acting on the disc rotor becomes the braking force acting between the wheels and the road surface. As described above, the braking force can be generated in each wheel according to a manipulation of the brake pedal of the driver.

Although not illustrated in detail in FIG. 1, the braking control device 15 has, for example, a CPU, a ROM, a RAM, and an input/output device like the vehicle control device 1. The braking control device 15 is input with braking force command values from a combine sensor 14 capable of detecting front-rear acceleration, lateral acceleration, and yaw rate, wheel speed sensors 11FL to 11RR installed on each wheel, and the vehicle control device 1 described above, and a sensor signal from a steering wheel angle detection device 21 via the steering control device 8 described later. In addition, an output of the braking control device 15 is connected to the brake control mechanism 13 having a pump and a control valve (not illustrated), and can generate an arbitrary braking force on each wheel independently of the manipulation of the brake pedal of the driver. The braking control device 15 estimates a spin, a drift-out, and a wheel lock of the vehicle 401 based on the above-mentioned information, controls the brake control mechanism 13 and the like so as to suppress the spin, the drift-out, and wheel lock of the vehicle 401 to generate the braking force for the corresponding wheel, and plays a role of improving steering stability of the driver. In addition, the vehicle control device 1 can generate an arbitrary braking force on the vehicle 401 by communicating the braking force command value to the braking control device 15, and plays a role of automatically braking in the automatic driving in which the driver does not manipulate. However, the present invention is not limited to the braking control device 15, and other actuators such as a brake-by-wire may be used.

Next, an operation of the steering will be described. When the driver is driving the vehicle 401, the steering torque detection device 7 and the steering wheel angle detection device 21 detect the steering torque and the steering wheel angle input by the driver via the steering wheel 6, respectively, and the steering control device 8 controls the motor 9 based on the information to generate an assist torque. Note that although not illustrated in detail in FIG. 1, the steering control device 8 also has, for example, a CPU, a ROM, a RAM, and an input/output device like the vehicle control device 1. The steering control mechanism 10 is movable and the front wheels are turned by a resultant force of the steering torque of the driver and the assist torque of the motor 9. On the other hand, a reaction force from the road surface is transmitted to the steering control mechanism 10 according to a turning angle of the front wheels, and is transmitted to the driver as a road surface reaction force.

The steering control device 8 can control the steering control mechanism 10 by generating the torque by the motor 9 independently of the steering manipulation of the driver. Therefore, the vehicle control device 1 can control the front wheels to an arbitrary turning angle by communicating the steering force command value to the steering control device 8, and plays a role of automatically steering in the automatic driving in which the driver does not manipulate. However, the present invention is not limited to the steering control device 8, and other actuators such as a steer-by-wire may be used.

Next, an accelerator will be described. The amount of depression of the accelerator pedal 17 of the driver is detected by a stroke sensor 18 and is input to the acceleration control device 19. Note that although not illustrated in detail in FIG. 1, the acceleration control device 19 also has, for example, a CPU, a ROM, a RAM, and an input/output device like the vehicle control device 1. The acceleration control device 19 adjusts a throttle opening degree according to the amount of depression of the accelerator pedal to control the engine (torque output). As described above, the vehicle 401 can be accelerated in response to the manipulation of the accelerator pedal of the driver. In addition, the acceleration control device 19 can control the throttle opening degree independently of the manipulation of the accelerator pedal of the driver. Therefore, the vehicle control device 1 can generate arbitrary acceleration in the vehicle 401 by communicating an acceleration command value to the acceleration control device 19, and plays a role of automatically accelerating in the automatic driving in which the driver does not manipulate.

Figure 2:
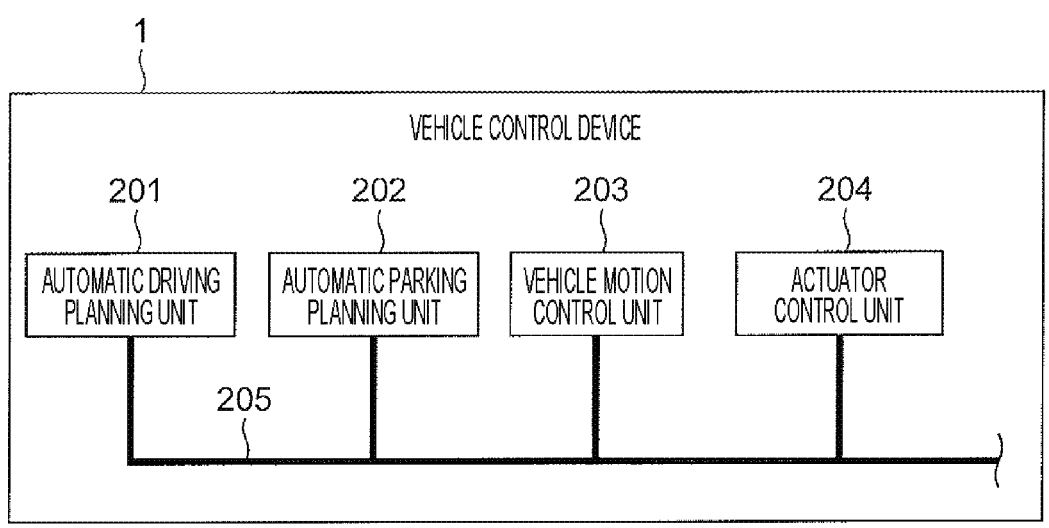
FIG. 2 is a block diagram illustrating a configuration of a vehicle control device according to the first embodiment of the present invention.

Next, a configuration of the automatic driving vehicle control device 1 of the present embodiment will be described with reference to a block diagram illustrated in FIG. 2.

The vehicle control device 1 of the illustrated embodiment basically includes an automatic driving planning unit (driving plan calculation unit) 201 that plans an operation of the own vehicle to automatically (automatic) drive the own vehicle to the destination, which will be described later, an automatic parking planning unit (driving plan calculation unit) 202 that plans the operation of the own vehicle to automatically park the own vehicle in a parking frame in a parking lot and the like, a vehicle motion control unit 203 that generates command values for controlling vehicle motion of the automatic driving vehicle, and an actuator control unit 204 for controlling each of the actuators 10, 13, and 20 (via the control devices 8, 15, and 19) of the above-mentioned steering, brake, engine, and the like, which are mounted on different controllers (ECUs) (such configurations are sometimes referred to as distributed controllers). Therefore, a vehicle network 205 is required for communication between the controllers. However, it is conceivable that the vehicle network 205 is wirelessly connected in addition to a wired connection. In addition, as a mounting method for each controller, it is conceivable that the automatic parking planning unit 202 and the automatic driving planning unit 201 are mounted on the same hardware. In addition, it is conceivable that the actuator control unit 204 is mounted on different hardware such as an engine control controller or a brake control controller.

Next, the configuration and operation of the automatic driving planning unit 201 included in the vehicle control device 1 of the present embodiment will be described with reference to the block diagram illustrated in FIG. 3.

The automatic driving planning unit 201 of the illustrated embodiment mainly includes a sensor information processing unit 305, a map information processing unit 306, a three-dimensional object behavior prediction unit 307, a storage unit 308, and a drivable area calculation unit 309. Each block will be described below.

Figure 3:
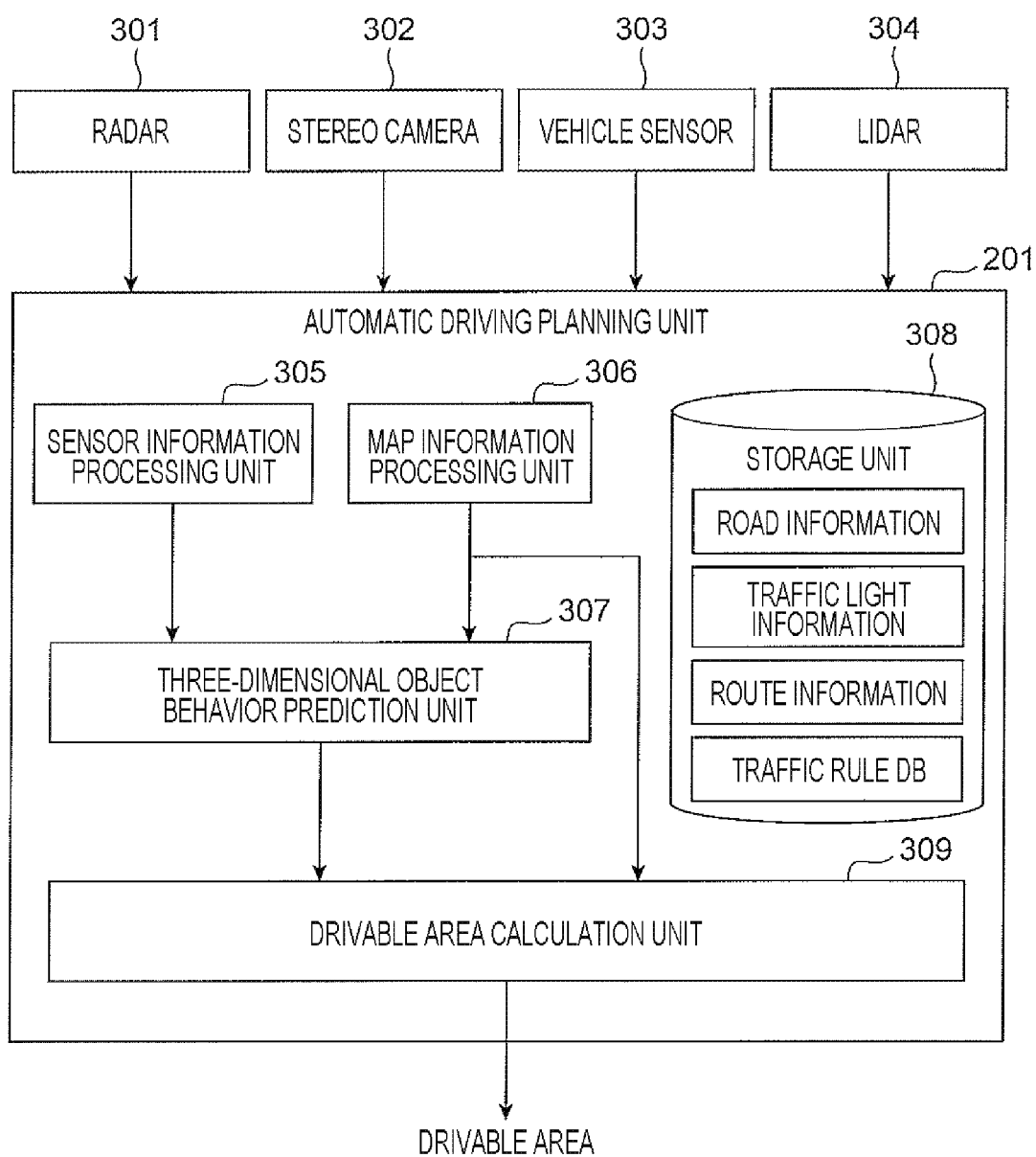
FIG. 3 is a block diagram illustrating a configuration of an automatic driving planning unit of the vehicle control device according to the first embodiment of the present invention.

In the example illustrated in FIG. 3, as a sensor that recognizes the outside world, a radar 301 that measures the distance and direction to an object by emitting radio waves toward the object and measuring a reflected wave, a stereo camera 302 that enables to record information in a depth direction by capturing the object from a plurality of different directions at the same time, a vehicle sensor 303 as a group of sensors that can detect the vehicle condition such as current location information of the automatic driving vehicle using a velocity of the vehicle, a rotational speed of a tire, and global navigation satellite system (GNSS), destination information that a person who boards the automatic driving vehicle inputs a navigation system as an interface, and destination information specified by an operator at a remote location using wireless communication such as a telephone line, and a lidar 304 that measures scattered light for laser irradiation that emits in a pulse shape and detects a distance to an object at a long distance are provided, and information of the surrounding environment (driving environment) obtained based on the information is input to the sensor information processing unit 305 and converted into object information such as a moving object existing around the own vehicle. As specific object information, attribute information such as pedestrians, bicycles, and vehicles, and current position and current velocity vectors thereof are extracted. Here, the moving object includes a parked vehicle or the like that may move in the future even if the velocity obtained at the current time is zero. In addition, there is a storage unit 308 that stores road information or traffic light information about a target point and its surroundings from a point where the own vehicle starts automatic driving, route information from the current position to the target point, a traffic rule database of a section to be traveled, and the like. In addition, there is a map information processing unit 306 for a format that can be used by organizing information such as lighting information of traffic lights that the automatic driving vehicle is planning to pass, based on lane center line information and traffic light information of the road required for automatic driving based on the information stored in the storage unit 308.

Next, the object information and the map information are input to the three-dimensional object behavior prediction unit 307 (from the sensor information processing unit 305 and the map information processing unit 306). The three-dimensional object behavior prediction unit 307 calculates future position and velocity information (object prediction information) of each moving object based on the input information. In order to predict the movement of each moving object, a position R $(X(T),Y(T))$ of each object at the future time T is predicted based on the object information. As a specific method of prediction, a method of performing prediction calculation based on the following Linear Prediction Equation (1) can be considered when the current position of the moving object is $Rn0(Xn(0), Yn(0))$ and the current velocity thereof is $Vn(Vxn,Vyn)$.

[Equation 1]

$$Rn(Xn(T), Yn(T)) = Vn(Vxn, Vyn) \times T + Rn0(Xn(0), Yn(0)) \quad \text{Formula (1)}$$

The calculation method here assumes that each object will move in a linear motion at a constant velocity while maintaining the current velocity in the future time. As a result, the three-dimensional object behavior prediction unit 307 can predict many objects in a short time.

Next, a three-dimensional object behavior prediction result and map information are input to the drivable area calculation unit 309 (from the three-dimensional object behavior prediction unit 307 and the map information processing unit 306). The drivable area calculation unit 309 calculates and outputs a drivable area that does not cause the own vehicle (automatic driving vehicle) to collide with other vehicles and three-dimensional objects existing around the own vehicle, and is suitable for route information and the current vehicle state (velocity, position, orientation, and the like), based on the input information, as will be described later.

Next, the drivable area of the present embodiment calculated by the drivable area calculation unit 309 will be described with reference to a schematic diagram of a typical scene illustrated in FIG. 4A. In this scene, the own vehicle 401 is performing automatic driving. In addition, the road is a road of an opposite one-lane, and another vehicle 402 is traveling on the opposite lane. In addition, there is a three-dimensional object (falling object) 403 on a left front side of a traveling direction of the own vehicle 401. There is also a fence 405 that is placed as a boundary between the road and a sidewalk. In addition, it is assumed that the own vehicle 401 can obtain information (road end information and road center information) of a road end point sequence 407 as an end of the road where the own vehicle 401 can safely stop and a road center line 406 as the center of the road by a method of obtaining from the detection information of the stereo camera 302 (see FIG. 3) or the map around the own vehicle based on the position information of the own vehicle 401, and the like. In addition, predicted track information 404 of another vehicle 402, which is an output result of the three-dimensional object behavior prediction unit 307, is obtained.

Figure 4A:
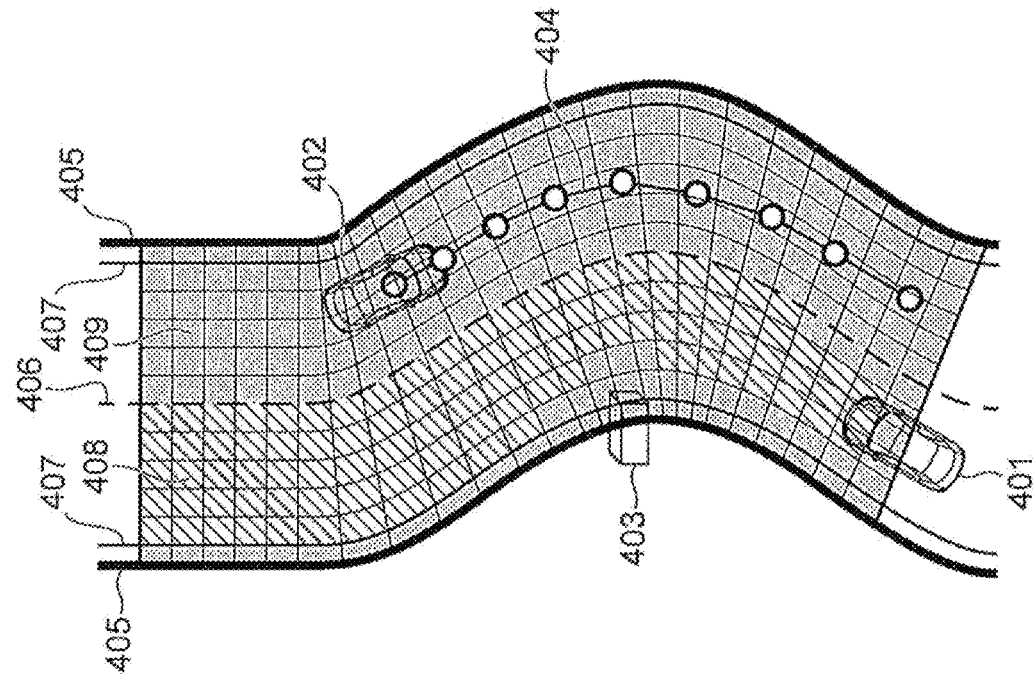
Figure 4B:
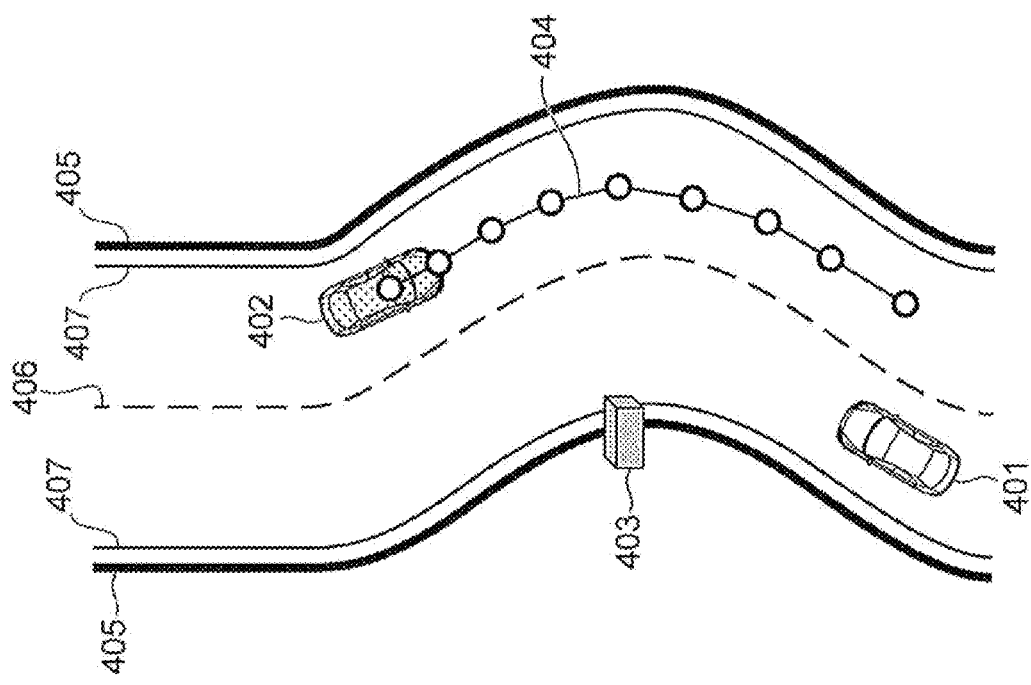

In this state, FIG. 4B illustrates a drivable area 408 and a non-drivable area 409. This is calculated based on whether or not the own vehicle (automatic driving vehicle) 401 collides with another vehicle 402 and the three-dimensional object 403 existing around the own vehicle 401, as described above, and the route information and the current vehicle state (velocity, position, orientation, and the like). More specifically, in the example illustrated in FIG. 4B, the drivable area calculation unit 309 divides the road between the two fences 405 into a plurality of segment areas (small spaces) at a predetermined distance (for example, a distance according to the velocity, etc.) from the current position of the own vehicle toward the traveling direction (direction of the destination), selects a plurality of segment areas (segment area group) in which the own vehicle (automatic driving vehicle) 401 does not collide with another vehicle 402 and the three-dimensional object 403 existing around the own vehicle 401 and suitable for route information and current vehicle conditions (velocity, position, orientation, etc.) (e.g., safe driving between the road end point sequence 407 and the road center line 406) among the plurality of segment areas as the drivable area 408, and selects (a plurality of) segment areas other than the drivable area 408 as the non-drivable area 409. In the scene illustrated in FIG. 4A, since a collision with the own vehicle 401 is predicted in the vicinity of the presence of the three-dimensional object 403, that portion is defined as the non-drivable area 409 as illustrated in FIG. 4B. As a method of calculating the collision, whether or not the probability that the own vehicle and the predicted moving object collide with each other at a future time is a predetermined value or more is calculated, if the probability is the predetermined value or more, it is determined that there is an influence on the own vehicle, and if the probability is the predetermined value or less, it is determined that there is no influence on the own vehicle. As a method of calculating the probability of collision, a method of using Time To Collision (TTC) between each object and the own vehicle at a future position can be considered. Here, TTC [s]=relative distance [m]=relative velocity [m/s]. As a determination method using the TTC, if the TTC is a first predetermined value or less, the collision probability is 50%, if the TTC is a second predetermined value (<first predetermined value) or less, the collision probability is 70%, and the like, and if the TTC has a collision probability of the first predetermined value or more, a method of determining a collision can be considered.

Figure 5B:
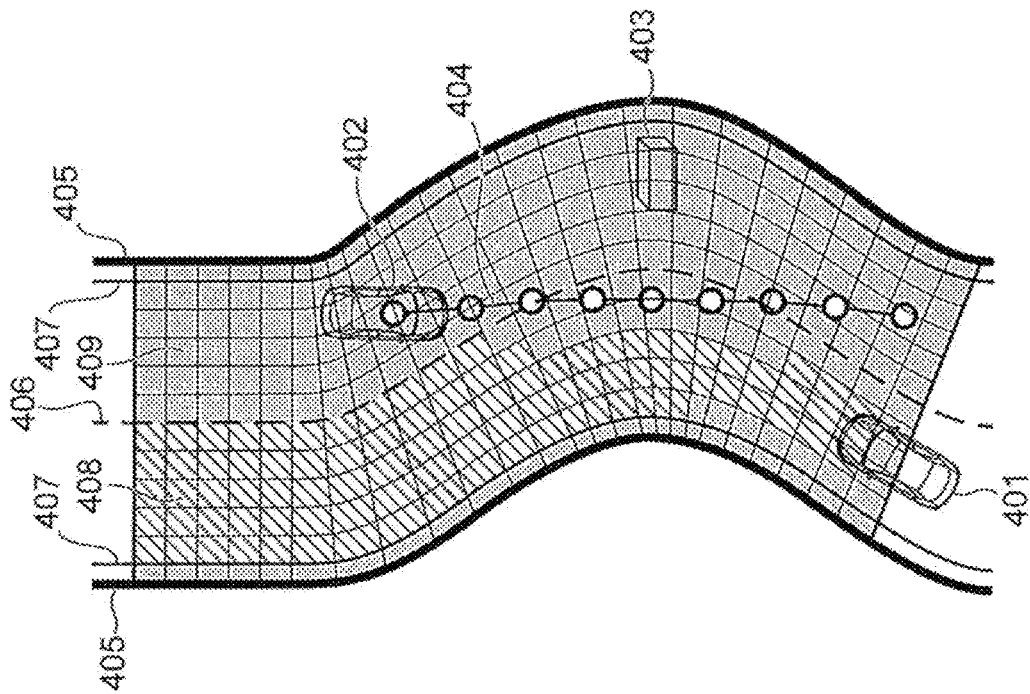
Figure 5A:
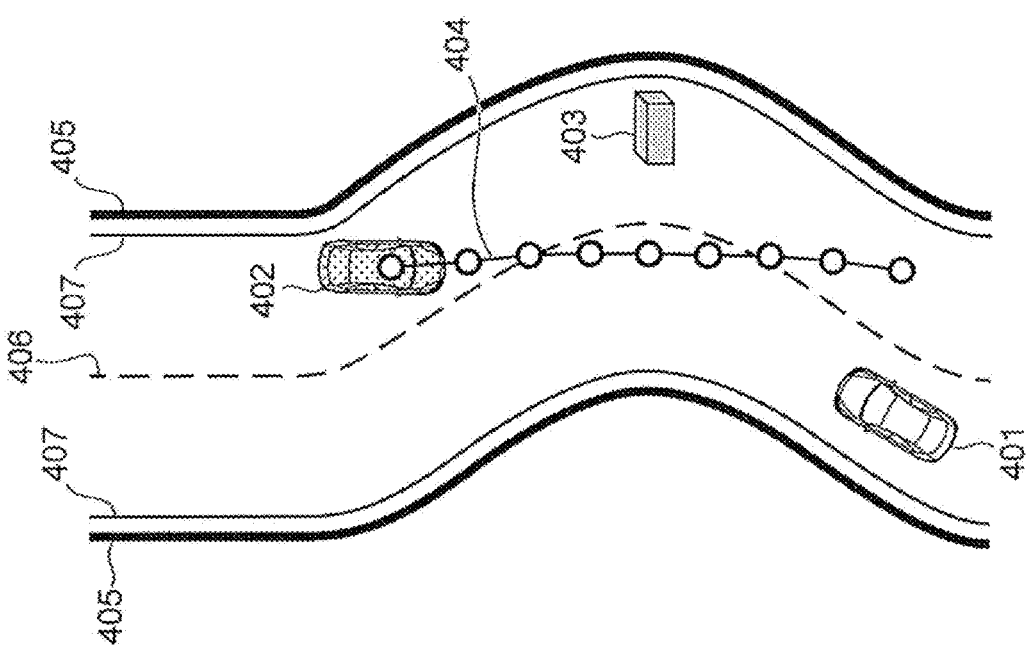

Next, the drivable area of the present embodiment calculated by the drivable area calculation unit 309 will be described with reference to a schematic diagram of a typical scene illustrated in FIG. 5A. A difference between FIG. 5A and FIG. 4A is that there is a three-dimensional object (falling object) 403 on the left front side of the traveling direction of another vehicle 402 traveling on the opposite lane. Therefore, it is predicted by the three-dimensional object behavior prediction unit 307 that another vehicle 402 travels out of the lane side where the own vehicle 401 exists. Therefore, there is a portion where the predicted track information 404 of another vehicle 402 exists on the own lane. As a result, as illustrated in FIG. 5B, a portion of the drivable area 408 illustrated in FIG. 4B becomes the non-drivable area 409. More specifically, in the example illustrated in FIG. 5B, the drivable area calculation unit 309 selects (defines) (a plurality of) segment areas adjacent to the road center line 406 near the three-dimensional object (falling object) 403 among the segment areas set in the lane (own lane) in which the own vehicle 401 exists as the non-drivable area 409. In addition, in the scene illustrated in FIG. 5A, as compared with the scene illustrated in FIG. 4A, since there is no three-dimensional object (falling object) on the lane side where the own vehicle 401 exists (specifically, the left front with respect to the traveling direction of the own vehicle 401), the drivable area calculation unit 309 selects (defines) the (plurality of) segment areas set in that portion as the drivable area 408.

As a result, the automatic driving planning unit 201 calculates a drivable area including a space in which the own vehicle 401 can safely drive according to a driving environment around the own vehicle 401 and a destination of the own vehicle 401.

The automatic parking planning unit 202 included in the vehicle control device 1 of the present embodiment is basically almost the same as the above-mentioned automatic driving planning unit 201, except for calculating the drivable area (up to the parking frame) and the non-drivable area during automatic parking when the destination is the parking frame such as a parking lot.

Next, the configuration and operation of the vehicle motion control unit 203 included in the vehicle control device 1 of the present embodiment will be described with reference to FIG. 6.

The vehicle motion control unit 203 calculates command values (also called actuator target values or track follow-up control command values) of actuators 10, 13 and 20 based on the drivable area and the surrounding map information output from the automatic driving planning unit 201 or the automatic parking planning unit 202. The vehicle motion control unit 203 includes a track candidate generation unit 601, a track evaluation unit 602, a target track determination unit 603, and a track follow-up control command value calculation unit 604. Each block will be described below.

Figure 7:
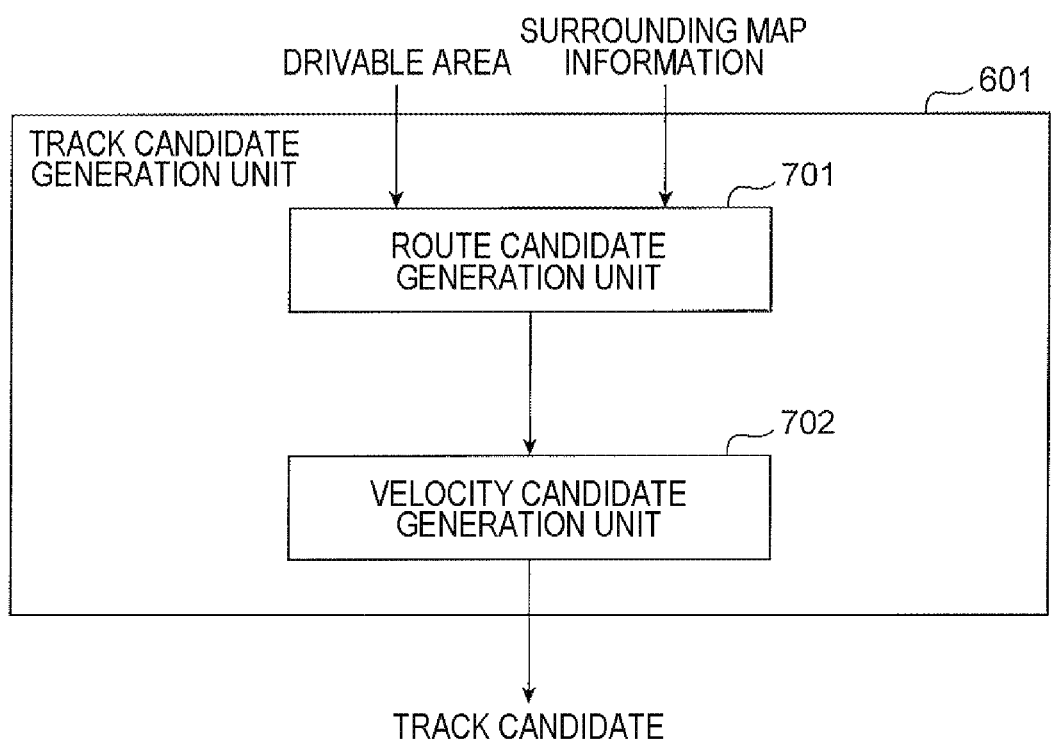
FIG. 7 is a block diagram illustrating a configuration of a track candidate generation unit of the vehicle control device according to the first embodiment of the present invention.

The track candidate generation unit 601 generates track candidates based on the drivable area and the surrounding map information. For example, as illustrated in FIG. 7, a method in which the track candidate generation unit 601 has a route candidate generation unit 701 and a velocity candidate generation unit 702 is conceivable. In this method, the route candidate generation unit 701 first calculates a route (a sequence of points that the own vehicle passes through without having time-series information) based on the drivable area and the surrounding map information. As a method for this, a method of selecting a route that satisfies the following Variation Equation (2) within the input drivable area as a candidate is conceivable.

[Equation 2]

$$\text{Min}\int_{t2}^{t1}(\text{Acceleration in Lateral Direction of Own Vehicle})2+w2(\text{Separated Amount from Target lane})2+w3(\text{Vehicle Head Angle for Tangent of Center Line of Lane})2]dt \quad \text{Formula (2)}$$

Here, as a method of calculating a future motion state of the own vehicle, a method of using a plant model of the vehicle is conceivable. As the plant model, for example, a bicycle model or a four-wheel model is conceivable. The behavior of the vehicle (vertical acceleration and lateral acceleration of vehicle, vehicle head angle, etc.) when traveling on the route calculated by Variation Equation (2) above can be obtained from the model. The velocity candidate generation unit 702 described below can also predict future vehicle behavior using the same model.

For the output of Equation (2), it is possible to generate a plurality of routes by changing weights (w1, w2, w3) of each coefficient and changing items to be evaluated. In addition, in addition to the output from Equation (2), a method of using the lane center point sequence of the own lane in the drivable area is also conceivable. For the plurality of (or even a single) route candidates, the velocity candidate generation unit 702 may use velocity sequence information that satisfies the following Equation (3) as the velocity candidates. w4, w5, and w6 in Equation (3) are the weights of each coefficient.

[Equation 3]

$$\text{Min}\int_{t1}^{t2}[w4(\text{Acceleration in Longitudinal Direction of Own Vehicle})2+w5(\text{Acceleration in Lateral Direction of Own Vehicle})2+w6(\text{Limit Velocity–Velocity of Own Vehicle})2]dt \quad \text{Formula (3)}$$

Figure 8:
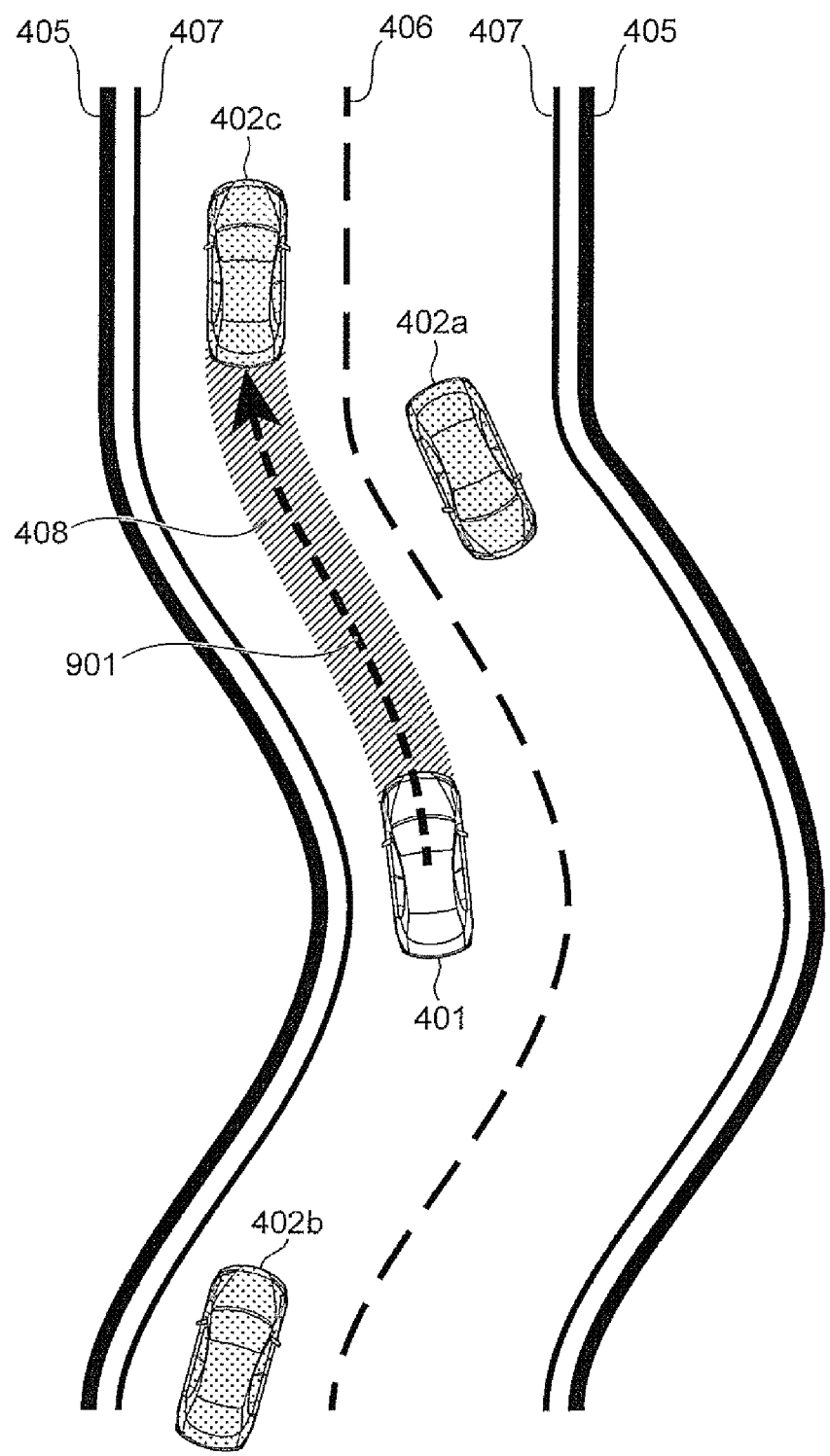
FIG. 8 is an explanatory diagram illustrating an example of an operation of automatic driving of an own vehicle.
Figure 9:
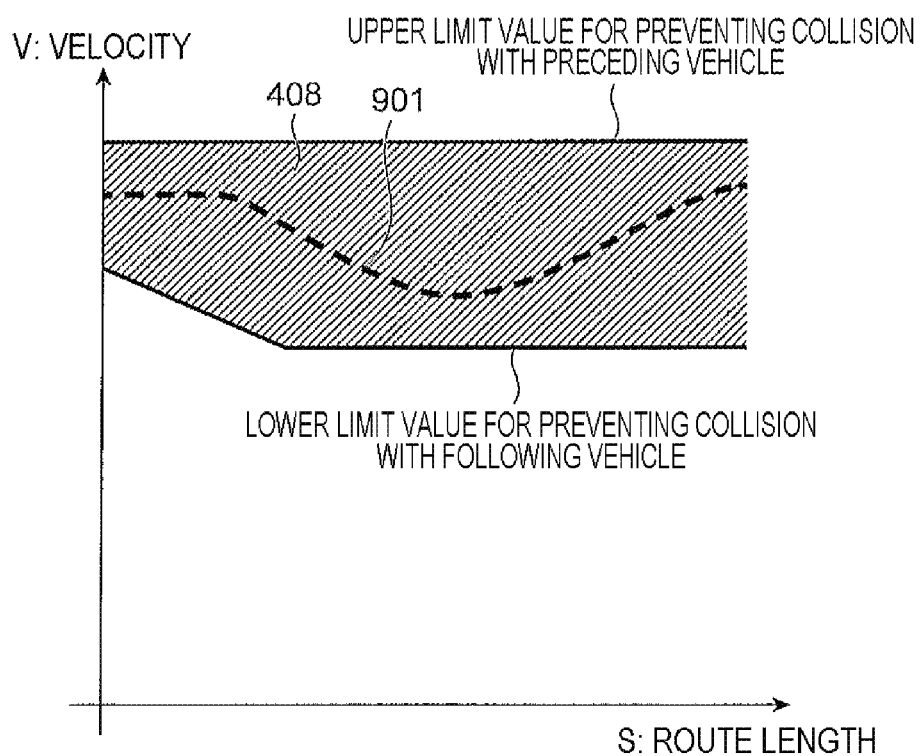
FIG. 9 is a diagram illustrating a relationship between a route length and a velocity of the vehicle.

Regarding the range that can be taken as a velocity candidate at this time, for example, in the scenes illustrated in FIGS. 4(a) and 5(a), since there are no other vehicles in front of or behind the own vehicle 401 (in the own lane), a method of searching within the range of a court velocity specified on the road or less is conceivable. On the other hand, for example, as in the scene shown in FIG. 8, when the own vehicle 401 travels along a route candidate (corresponding to the target track described later) 901 generated in the drivable area 408, another vehicle (opposite vehicle) 402a exists on the opposite lane, and other vehicles (preceding vehicle 402c and following vehicle 402b) exist in front of and behind the own vehicle 401 (in the own lane), a velocity range in which the own vehicle 401 can travel without collision is limited. For example, as illustrated in FIG. 9, when a horizontal axis is a route length of a candidate route and a vertical axis is a velocity, as the velocity range (velocity width) of the own vehicle 401, it is possible to specify an upper limit velocity for preventing a collision with the preceding vehicle 402c and a lower limit velocity for preventing a collision with the following vehicle 402b. As a method of calculating the upper limit velocity and the lower limit velocity, a method of calculating the velocity of the own vehicle so that the TTC between the preceding vehicle 402c and the following vehicle 402b does not fall within a predetermined time (for example, within 2 seconds) is conceivable.

Figure 10:
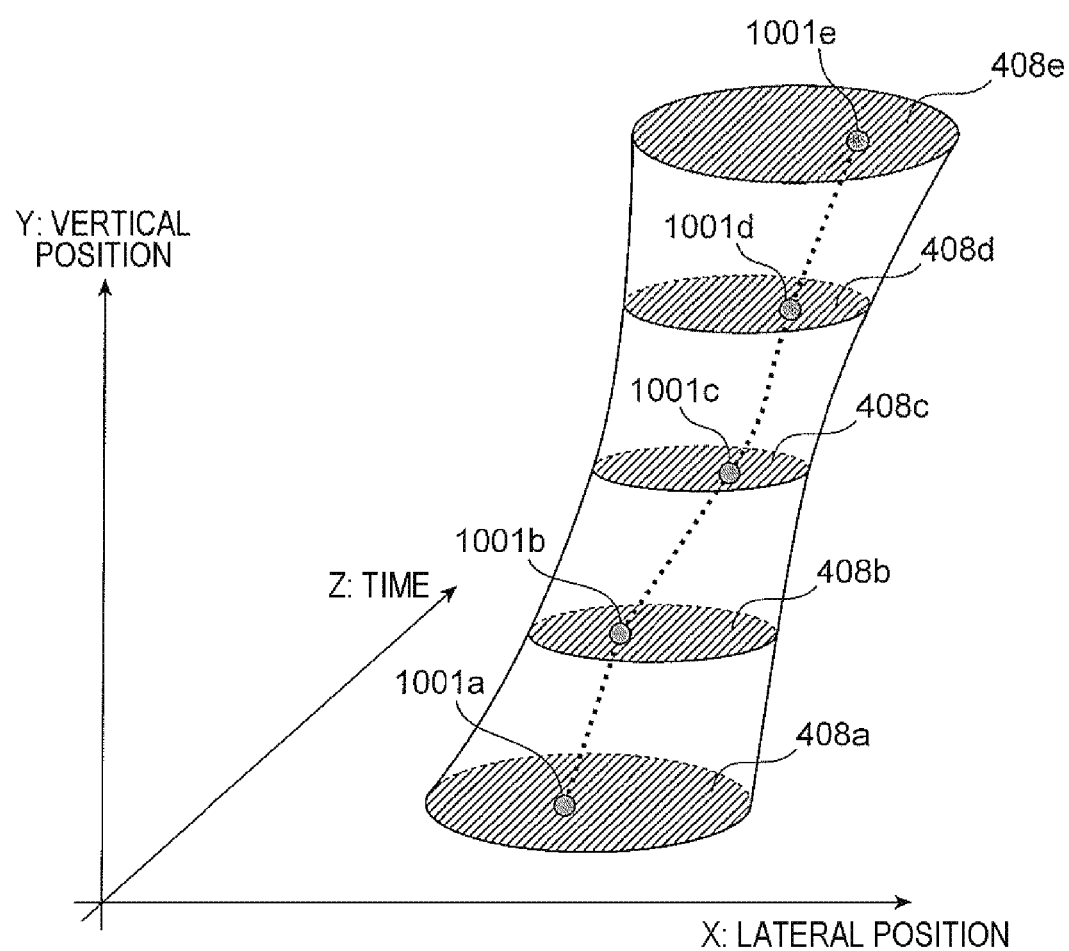
FIG. 10 is a diagram illustrating a relationship between a lateral position and a longitudinal position of the vehicle and a planned time.

In addition, more generally, as illustrated in FIG. 10, a method defining (creating) drivable areas 408a to 408e by calculating the collision probability of another object (another vehicle, etc.) in the lateral position, the vertical position, and the time direction of the vehicle is also conceivable. A method of defining (creating) candidate track point sequences 1001a to 1001e, which are target operating point sequences, in this space is also conceivable. In addition, a method of simultaneously obtaining the generation of the route candidate and the velocity candidate described above is also conceivable.

Based on the methods described above, the track candidate generation unit 601 generates a track candidate including the route candidate and the velocity candidate, and outputs the track candidate to the track evaluation unit 602.

Returning to FIG. 6, the track evaluation unit 602 then evaluates the track candidate generated by the track candidate generation unit 601. As an evaluation method in the track evaluation unit 602, for each track candidate, a method is conceivable as evaluation items indicating the riding comfort of the following Equation (4) (for example, a linear sum of a square of acceleration in the lateral direction of the vehicle, a square of acceleration in the vertical direction of the vehicle, and the squares of jerks obtained by differentiating those accelerations). However, v1, v2, v3, and v4 are weighting factors.

[Equation 4]

$$\text{Riding Comfort Evaluation Value}=v1\times(\text{Acceleration in Lateral Direction of Vehicle})2+v2\times(\text{Acceleration in Vertical Direction of Vehicle})2+v3\times(\text{Jerk in Lateral Direction of Vehicle})2+v4\times(\text{Jerk in Vertical Direction of Vehicle})2 \quad \text{Formula (4)}$$

Next, the target track determination unit 603 selects a candidate track that satisfies a predetermined riding comfort condition from each track candidate evaluated by the track evaluation unit 602. As a method of selection in the target track determination unit 603, a method of selecting a candidate track having the most comfortable evaluation value (that is, the highest evaluation value of riding comfort) is conceivable for each track candidate. The target track determination unit 603 outputs the selected candidate track as the target track to the track follow-up control command value calculation unit 604. However, at this time, a method in which the target track determination unit 603 weights and adjusts the riding comfort evaluation value obtained by the track evaluation unit 602 so that the candidate track once selected is not changed for a predetermined time is conceivable. For example, in the next calculation cycle in which the candidate track intended to change the lane is selected, when the target track determination unit 603 side selects the candidate track intended for the current lane without changing the lane, this is because the occupants may be anxious about the operation of the vehicle.

Next, the track follow-up control command value calculation unit 604 calculates a steering command value, a brake operation amount, an engine output value, and the like so that the vehicle 401 follows the target track selected and determined by the target track determination unit 603. This method will be described with reference to a flowchart of FIG. 11.

Figure 11:
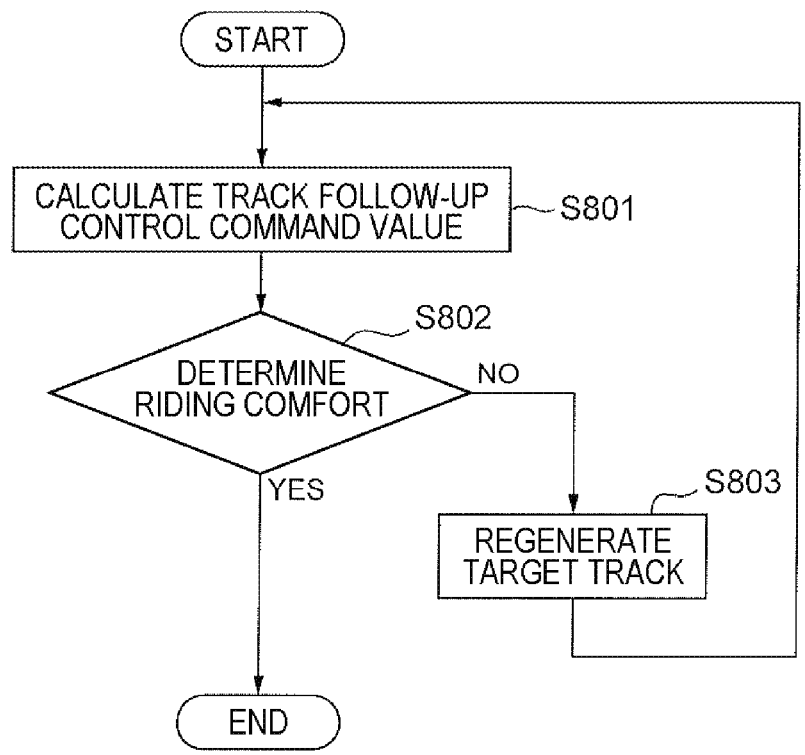
FIG. 11 is a flowchart illustrating processing of a track follow-up control command value calculation unit of the vehicle control device according to the first embodiment of the present invention.

As illustrated in FIG. 11, in step S801, the track follow-up control command value calculation unit 604 (CPU) calculates the steering, brake, and engine command values (track follow-up control command values) for following the target track with respect to the target track determined by the target track determination unit 603. As a method of calculating the command value of the steering, a method of determining a steering amount so as to reduce an error from the target track is known. In addition, as a method of calculating the command values for the engine and the brake that realize the target velocity, a method of using a conventional cruise control control calculation method capable of controlling the vehicle at a predetermined velocity is conceivable.

In step S802, the track follow-up control command value calculation unit 604 (CPU) determines the riding comfort based on the track follow-up control command value obtained in step S801. Here, by inputting the track follow-up control command value obtained in step S801 into the plant model of the vehicle, the acceleration or the addition velocity generated in the vehicle is calculated, and it is determined that the value is within a predetermined value range (for example, 2 m/s$^2$ as an upper limit value of acceleration). Here, as the plant model, it is conceivable to use the bicycle model or the four-wheel model as described above (see the track candidate generation unit 601 and the track evaluation unit 602 described above), but in order to perform the calculation in a shorter calculation cycle, as simple calculation processing, a method of referring to a table in which the vehicle state and the target control amount are input in advance is also conceivable. As a result of the riding comfort determination, if it is determined that the riding comfort is good, the flow ends (that is, the track follow-up control command value obtained in step S801 is output), and if it is determined that the riding comfort is poor (in other words, when the riding comfort deviates from a predetermined riding comfort condition while driving the own vehicle), the flow proceeds to step S803.

In step S803, the track follow-up control command value calculation unit 604 (CPU) regenerates the target track based on the drivable area, the surrounding map information, and the target track before regeneration. As a method of regenerating the target track here, a method of regenerating the target track so as to smoothly connect current position coordinates of the own vehicle to the target track before regeneration is conceivable.

Figure 12:
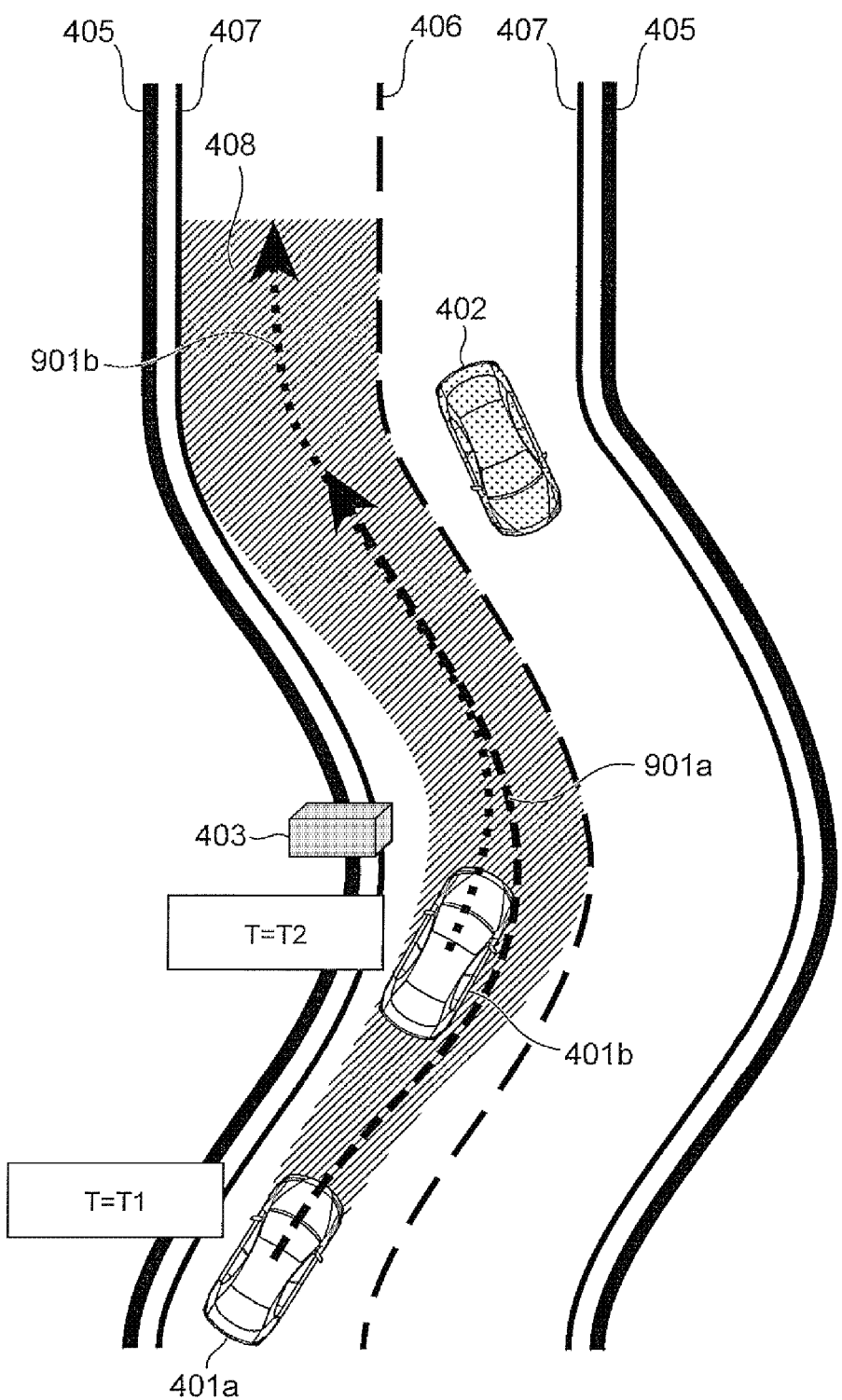
FIG. 12 is an explanatory diagram illustrating an example of an operation of automatic driving of the own vehicle.
Figure 13:
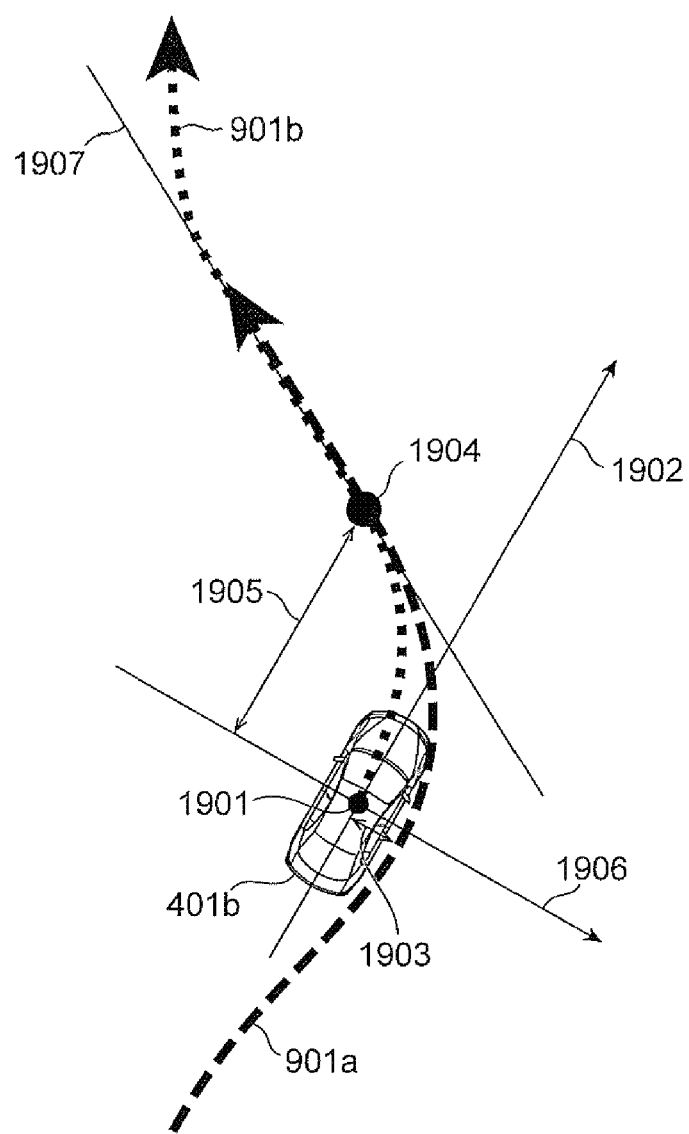
FIG. 13 is an explanatory diagram illustrating a conceptual diagram at the time of target track regeneration.

FIG. 12 illustrates an own vehicle 401a and its target track (hereinafter, may be referred to as a target track before regeneration) 901a at time T1 and an own vehicle 401b and its target track 901b (hereinafter, may be referred to as a target track after regeneration) at time T2 in the scene illustrated in FIG. 4A described above, and FIG. 13 illustrates a conceptual diagram of a target track regeneration method in the scene illustrated in FIG. 12. As illustrated in FIG. 13, when there is a separation amount 1903 between the current position (vehicle center or vehicle center of gravity position) 1901 of the own vehicle 401b and the target track 901a before regeneration at the current time T2, the target track 901b is regenerated so as to set a reconnection point (also called a track connection point) 1904 for the target track 901a before regeneration (specifically, on the target track 901a before regeneration on the traveling direction side from the current position of the own vehicle 401b) and extend the target track 901a before regeneration, if necessary. Here, based on a current velocity direction of the own vehicle 401b, a current velocity direction axis 1902 of the own vehicle 401b and a vertical axis 1906 with respect to the current velocity direction axis 1902 are set.

Figure 14:
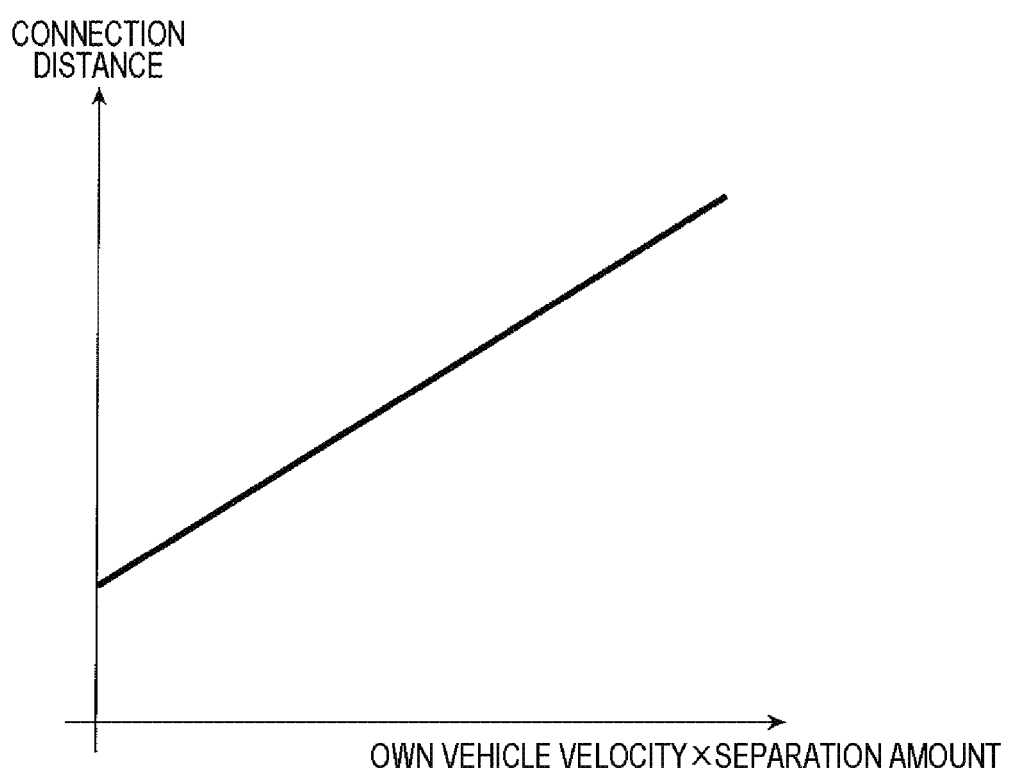
FIG. 14 is an explanatory diagram illustrating a method of setting a reconnection point at the time of target track regeneration.

Next, a method of setting the reconnection point 1904 described above will be described with reference to FIG. 14. As illustrated in FIG. 14, when a horizontal axis is the product of the separation amount and the own vehicle velocity, and a vertical axis is a connection distance from the own vehicle to the reconnection point, the reconnection point 1904 is set so that as the product of the separation amount 1903 (distance in the axis 1906 direction) and the velocity of the own vehicle 401b increases, the connection distance 1905 (distance in the axis 1902 direction) from the current position 1901 of the own vehicle 401b to the reconnection point 1904 increases.

In addition, a method in which the target track 901b is determined so that slopes 1907 of tangents at the reconnection points 1904 of the target track 901a before regeneration and the target track 901b after regeneration substantially match is also conceivable.

By doing so, if the separation amount 1903 is large or the velocity of the own vehicle 401b is large, the connection distance 1905 to the reconnection point 1904 becomes large, the target track (target track after regeneration) 901b is generated so as to be smoothly connected to the target track 901a before regeneration, and the riding comfort of the own vehicle is not impaired.

The track follow-up control command value calculation (step S801) and the riding comfort determination (step S802) are repeatedly performed on the target track regenerated in step S803, and as a result of the riding comfort determination, when it is determined that the riding comfort is good, the flow ends (that is, the track follow-up control command value obtained in step S801 is output).

Next, regarding the movement of the vehicle motion control unit 203 of the vehicle control device 1 of the first embodiment, for example, the action and effect in the situation illustrated in FIG. 12 will be described below.

The scene illustrated in FIG. 12 is a scene in which the own vehicle 401 is located at the position of the own vehicle 401a at time T1, and the target track 901a is generated based on the drivable area 408 and the surrounding conditions to perform follow-up control. When the time T2 is reached after a predetermined time (for example, 10 msec) has elapsed, the own vehicle 401 has moved to the position of the own vehicle 401b. During this period, the own vehicle 401 was performing follow-up control so as to follow the target track 901a, but it is assumed that an error has occurred from the target track 901a due to the road surface condition or the vehicle state. In addition, it is assumed that the drivable area 408 has not been updated since the time T1. Here, if control is performed so as to follow the target track 901a created at time T1, it is necessary to increase a control amount (for example, a steering angle), and as a result, there is a concern that the riding comfort may deteriorate. Therefore, the vehicle motion control unit 203 (track follow-up control command value calculation unit 604) generates a track again in the drivable area 408 (that is, regenerates the target track 901b) and performs control to follow a new target track 901b such that it is possible to carry out automatic driving that is safe and does not impair the riding comfort without increasing the control amount.

As described above, the actuator control unit 204 included in the vehicle control device 1 of the present embodiment arbitrarily control each of the actuators 10, 13, and 20 such as the steering, the brake, and the engine (via the control devices 8, 15 and 19) based on the track follow-up control command value (actuator target) output from (the track follow-up control command value calculation unit 604 of) the vehicle motion control unit 203 described above, such that the vehicle control device 1 realizes the above-mentioned automatic driving.

As described above, according to the vehicle control device 1 of the present embodiment, since the frequency of acceleration/deceleration of the own vehicle is reduced by stabilizing track follow-up control of the own vehicle, it is possible to prevent the riding comfort from deteriorating. In addition, by mounting the automatic driving system on a plurality of controllers, even if the failure occurs in one controller, the other controllers can safely drive (travel/stop).

Second Embodiment

Next, a second embodiment of the present invention will be described in detail with reference to FIGS. 15 to 21. In the second embodiment. The difference from the above-described first embodiment is that the vehicle motion control unit 203 has a failure detection unit 1501 and a track-at-the-time-of-failure generation unit 1502 as a fail-safe configuration or backup configuration when the automatic driving planning unit 201 or automatic parking planning unit 202 that calculates and outputs the drivable area fails. Other configurations are substantially the same as those of the first embodiment described above, and the same configurations as those of the first embodiment are designated by the same reference numerals and detailed description thereof will be omitted.

Figure 15:
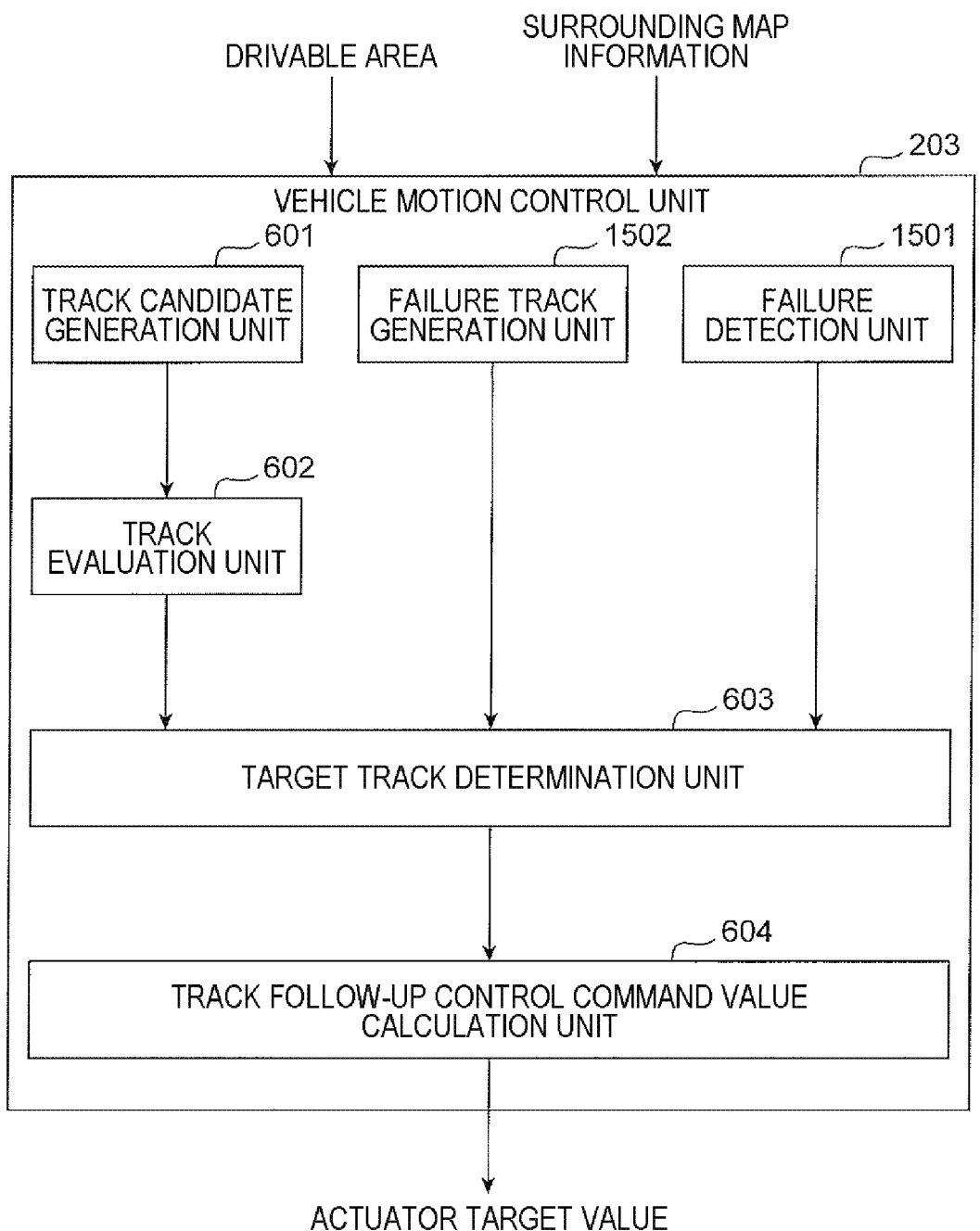
FIG. 15 is a block diagram illustrating a configuration of a vehicle motion control unit of the vehicle control device according to a second embodiment of the present invention.

The configuration and operation of the vehicle motion control unit 203 mounted on the vehicle control device 1 of the present embodiment will be described with reference to the block diagram illustrated in FIG. 15.

As illustrated in the figure, in the second embodiment, a failure detection unit 1501 and a track-at-the-time-of-failure generation unit 1502 are added to the above-described first embodiment.

The failure detection unit 1501 detects that the automatic driving planning unit 201 and the automatic parking planning unit 202 (see FIG. 2) have failed and cannot transmit a normal drivable area. In other words, the failure detection unit 1501 detects that a failure occurs in the automatic driving planning unit 201 or the automatic parking planning unit 202 while the own vehicle is driving, and it is no longer possible to receive the normal drivable area from the automatic driving planning unit 201 or the automatic parking planning unit 202. For example, when the failure detection unit 1501 detects that the result of the drivable area received via an in-vehicle network 205 has not been updated for a predetermined time, a method of determining that the automatic driving planning unit 201 or the automatic parking planning unit 202 is out of order is conceivable. The failure detection information of the failure detection unit 1501 is transmitted to the target track determination unit 603.

Figure 16:
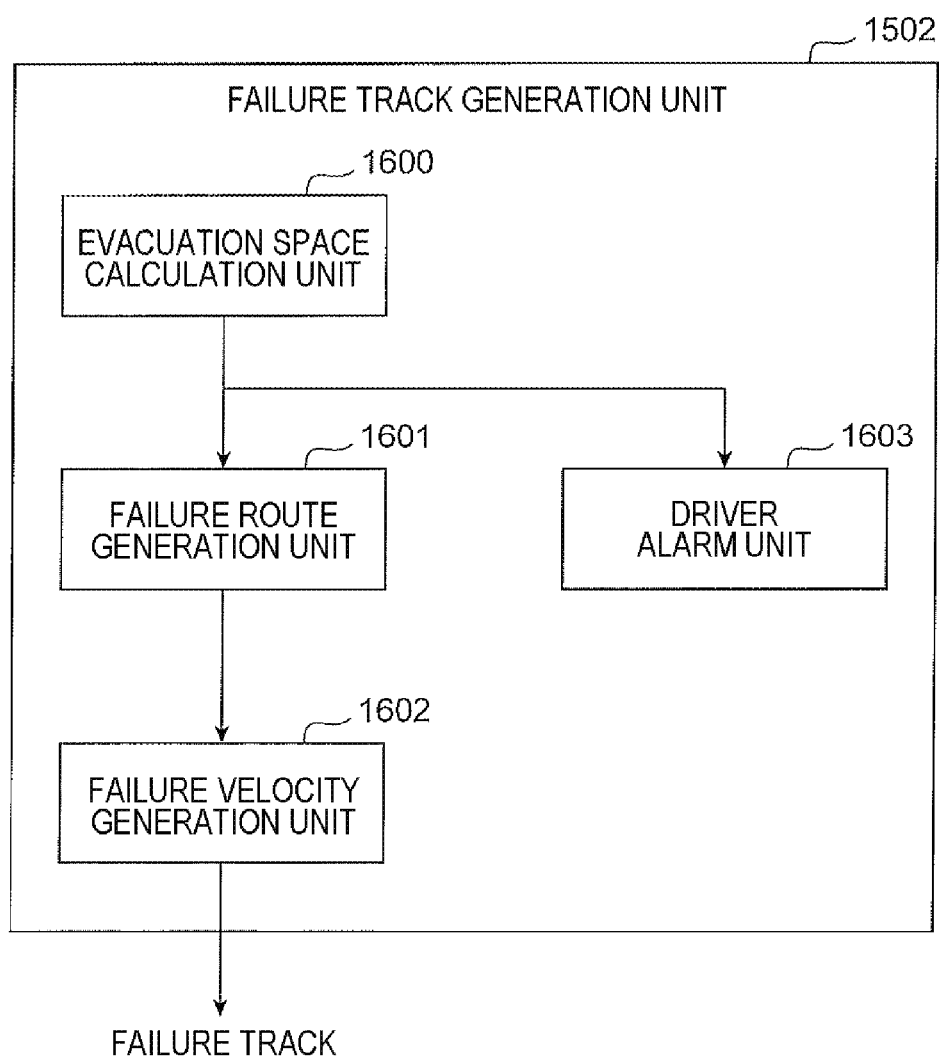
FIG. 16 is a block diagram illustrating a configuration of a track generation unit at the time of failure of the vehicle control device according to the second embodiment of the present invention.

Next, the track-at-the-time-of-failure generation unit 1502 generates a track-at-the-time-of-failure based on the drivable area and the surrounding map information. Therefore, as illustrated in FIG. 16, a method in which the track at the time of-failure generation unit 1502 includes an evacuation space calculation unit 1600, a route-at-the-time-of-failure generation unit 1601, a failure velocity generation unit 1602, and a driver alarm unit 1603 is conceivable.

The method of the track-at-the-time-of-failure generation unit 1502 will be described with reference to FIG. 17. In the scene illustrated in FIG. 17, it is assumed that the failure detection unit 1501 detects a failure at time Ta. At this time, the evacuation space calculation unit 1600 calculates connection road end information 1401 by using the latest information of the drivable area 408 and the road end point sequence 407 received up to this time Ta. The calculation of the connection road end information 1401 is performed, for example, by extracting the road end point sequence 407 which is the road end information currently in the own lane in the drivable area 408. Regarding the road end point sequence 407, which is the road end information, a method of calculating based on the map information stored in the storage unit 308 (see FIG. 3) together with the position of the own vehicle, and a method of using the information from the stereo camera 302 (see FIG. 3) mounted on the own vehicle as a vehicle sensor are conceivable. For example, when the parked vehicle 402d exists in front of the left front of the own vehicle 401 as illustrated in FIG. 18, since the drivable area 408 is not defined at the position of the parked vehicle 402d (in other words, the non-drivable area is defined at the position of the parked vehicle 402d and the drivable area is defined at the position avoiding the parked vehicle 402d), the connection road end information 1401 is defined in front of the parked vehicle 402d.

Next, the evacuation space calculation unit 1600 calculates the evacuation space 1402, which is an area (space) that can be safely stopped (vehicle stopped) from a vehicle size of the own vehicle 401, at a predetermined position of the connection road end information 1401 based on the latest drivable area 408 and the connection road end information 1401 received up to this time Ta. The calculation of the evacuation space 1402 is performed, for example, by extracting an area (space) larger than the vehicle size of the own vehicle 401 and closest to the own vehicle 401 from the connection road end information 1401. Regarding the evacuation space 1402, a method of calculating based on the map information stored in the storage unit 308 (see FIG. 3) together with the position of the own vehicle, and a method of using the information from the stereo camera 302 (see FIG. 3) mounted on the own vehicle as a vehicle sensor are conceivable.

On the other hand, when the evacuation space calculation unit 1600 cannot detect the evacuation space 1402 in the drivable area 408, the driver alarm unit 1603 generates an alarm urging the driver to safely stop the own vehicle 401 by operating the driver.

With respect to the evacuation space 1402 calculated by the above method in the evacuation space calculation unit 1600, the route-at-the-time-of-failure generation unit 1601 and the failure velocity generation unit 1602 calculate the track-at-the-time-of-failure (also called an evacuation retracted track) that safely operates and stops the own vehicle 401 within the latest drivable area 408 that has been received so far. Since the generation of the track-at-the-time-of-failure by the route-at-the-time-of-failure generation unit 1601 and the failure velocity generation unit 1602 is almost the same as the generation of the track candidate (corresponding to the target track) by the route candidate generation unit 701 and the velocity candidate generation unit 702 of the track candidate generation unit 601 described with reference to FIGS. 6 and 7, a detailed description is omitted here. In addition, here, the route-at-the-time-of-failure generation unit 1601 and the failure velocity generation unit 1602 calculate one track-at-the-time-of-failure, but it is natural that the route-at-the-time-of-failure generation unit 1601 and the failure velocity generation unit 1602 calculate a plurality of (candidate) track-at-the-time-of-failures in the drivable area 408, and evaluate those (candidate) track-at-the-time-of-failures, similar to the route candidate generation unit 701 and the velocity candidate generation unit 702 of the track candidate generation unit 601. For example, in the case of the scene illustrated in FIG. 19 corresponding to FIG. 17, the track-at-the-time-of-failure 1301 is calculated by the route-at-the-time-of-failure generation unit 1601 and the failure velocity generation unit 1602 together with the normal track candidate (corresponding to the target track) 901.

In addition, regarding another track-at-the-time-of-failure generation method, when a sensor for monitoring the driver status (for example, whether or not the driver is seated) is attached to the own vehicle 401, it is determined whether or not the driver can take over the driving, and when it is determined that the takeover of driving to the driver can be completed within a predetermined time (for example, 2 seconds), the route-at-the-time-of-failure generation unit 1601 travels on a conventional target track within the predetermined time, and after the predetermined time, generates a route (deviating) from the target track toward (evacuate to) the evacuation space. This method will be described with reference to FIG. 20 corresponding to FIGS. 17 and 19. The route-at-the-time-of-failure generation unit 1601 generates a failure takeover route 1303 with respect to the target track 901 before the failure. When generating the failure takeover route 1303, the route-at-the-time-of-failure generation unit 1601 uses the same route as the target track 901 before the failure for the route 1302 that can travel within a predetermined time, and subsequently branches the route to the evacuation space 1402 (calculated by the evacuation space calculation unit 1600 in advance) from a predetermined position of the target track 901 to generate the route. At this time, as a method of setting the evacuation space 1402 by the evacuation space calculation unit 1600, a method of searching for a space in the drivable area 408 that can be safely stopped after traveling for a predetermined time is conceivable.

If it is possible to take over the driving to the driver within a predetermined time by generating the route (and track) by the track-at-the-time-of-failure generation unit 1502 as described above, the driving of the own vehicle 401 can be continued without immediately stopping in the evacuation space.

The track-at-the-time-of-failure generated by the track-at-the-time-of-failure generation unit 1502 is transmitted to the target track determination unit 603.

Figure 21:
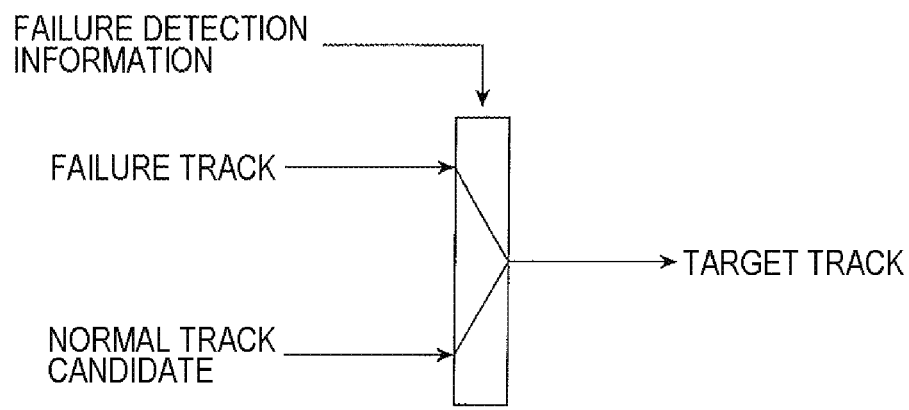
FIG. 21 is a block diagram illustrating a configuration of a target track determination unit of the vehicle control device according to the second embodiment of the present invention.

Returning to FIG. 15, the target track determination unit 603 calculates and determines the target track based on the block diagram illustrated in FIG. 21. That is, in the normal time, as described above, the target track determination unit 603 selects the candidate track that satisfies a predetermined riding comfort condition from each track candidate generated by the track candidate generation unit 601 and evaluated by the track evaluation unit 602, but selects the track-at-the-time-of-failure as the target track when it is determined based on the failure detection information of the failure detection unit 1501 that the automatic driving planning unit 201 or the automatic parking planning unit 202 is out of order based on the failure detection information.

The track follow-up control command value calculation unit 604 calculates and outputs a steering command value, a brake operation amount, an engine output value, and the like so that the vehicle 401 follows the target track selected and determined by the target track determination unit 603 as described above. Note that at this time, when the driver takes over the driving, the track follow-up control command value calculation unit 604 calculates and outputs the steering command value, the brake operation amount, the engine output value, and the like according to the calculation.

Next, regarding the movement of the vehicle motion control unit 203 of the vehicle control device 1 of the second embodiment, for example, the action and effect in the situation illustrated in FIG. 17 will be described below.

Figure 17:
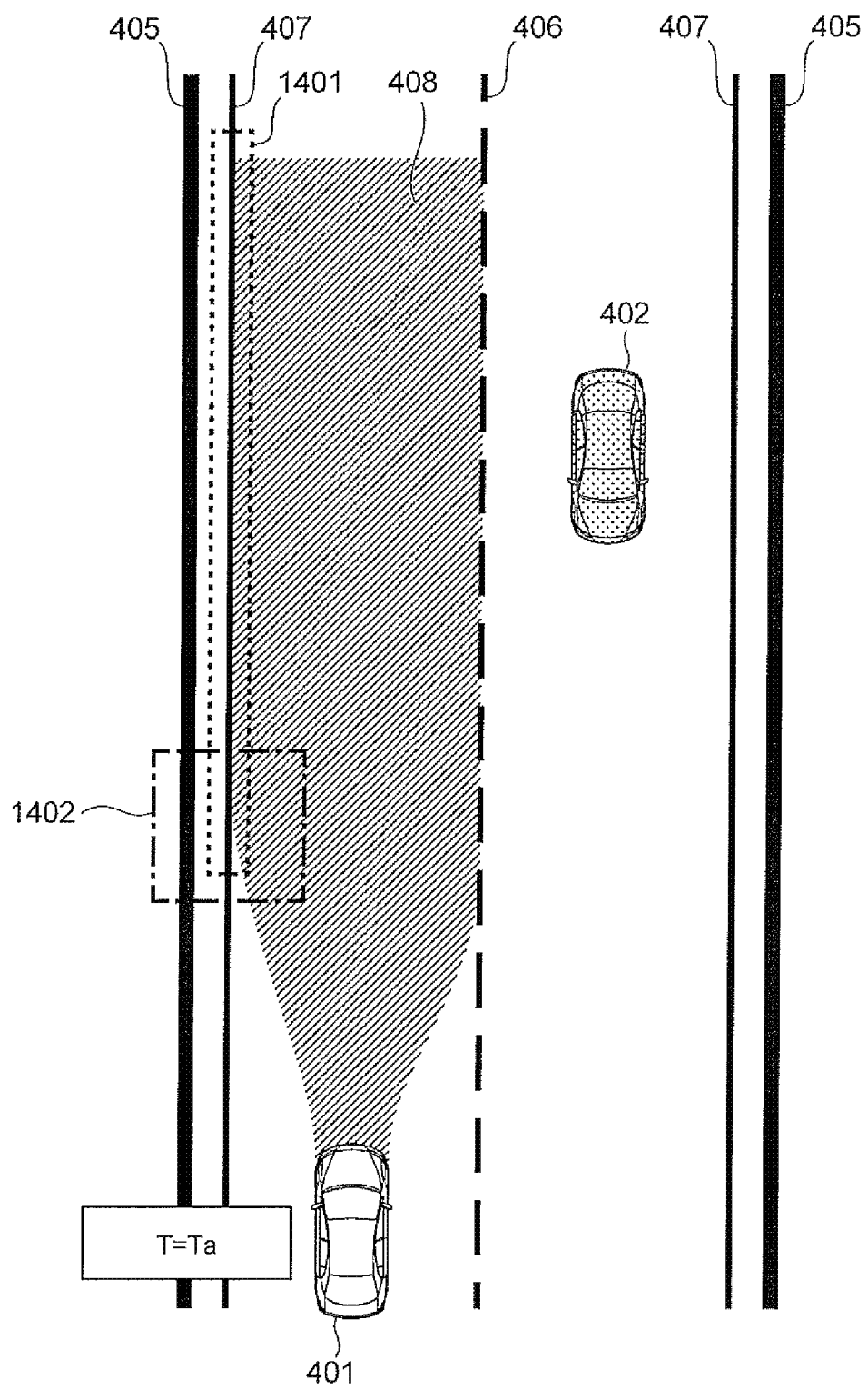
FIG. 17 is an explanatory diagram illustrating a relationship between an evacuation space when a failure occurs and a roadside connection position.
Figure 18:
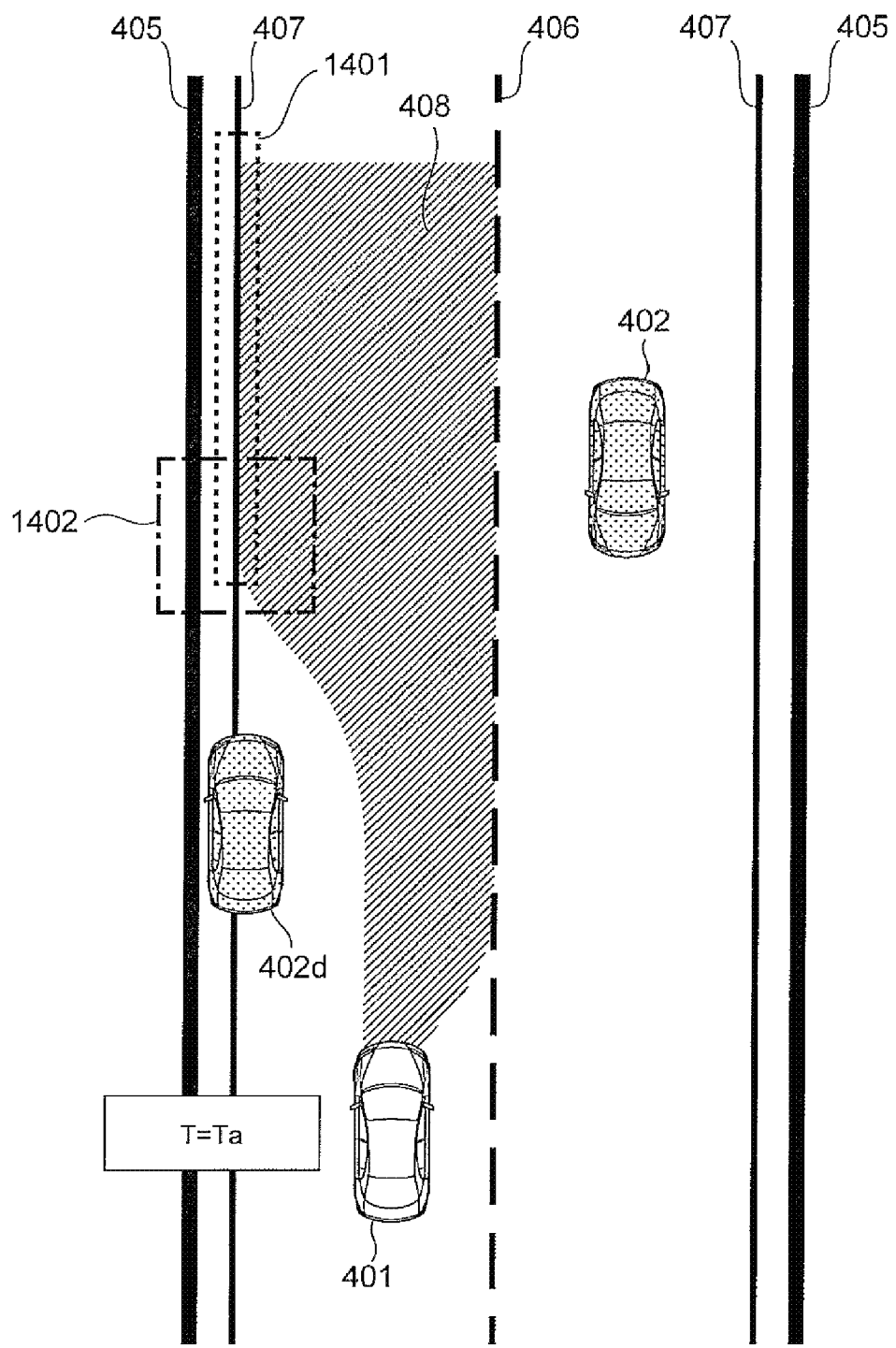
FIG. 18 is an explanatory diagram illustrating a relationship between the evacuation space when a failure occurs in which a parked vehicle exists and the roadside connection position.
Figure 19:
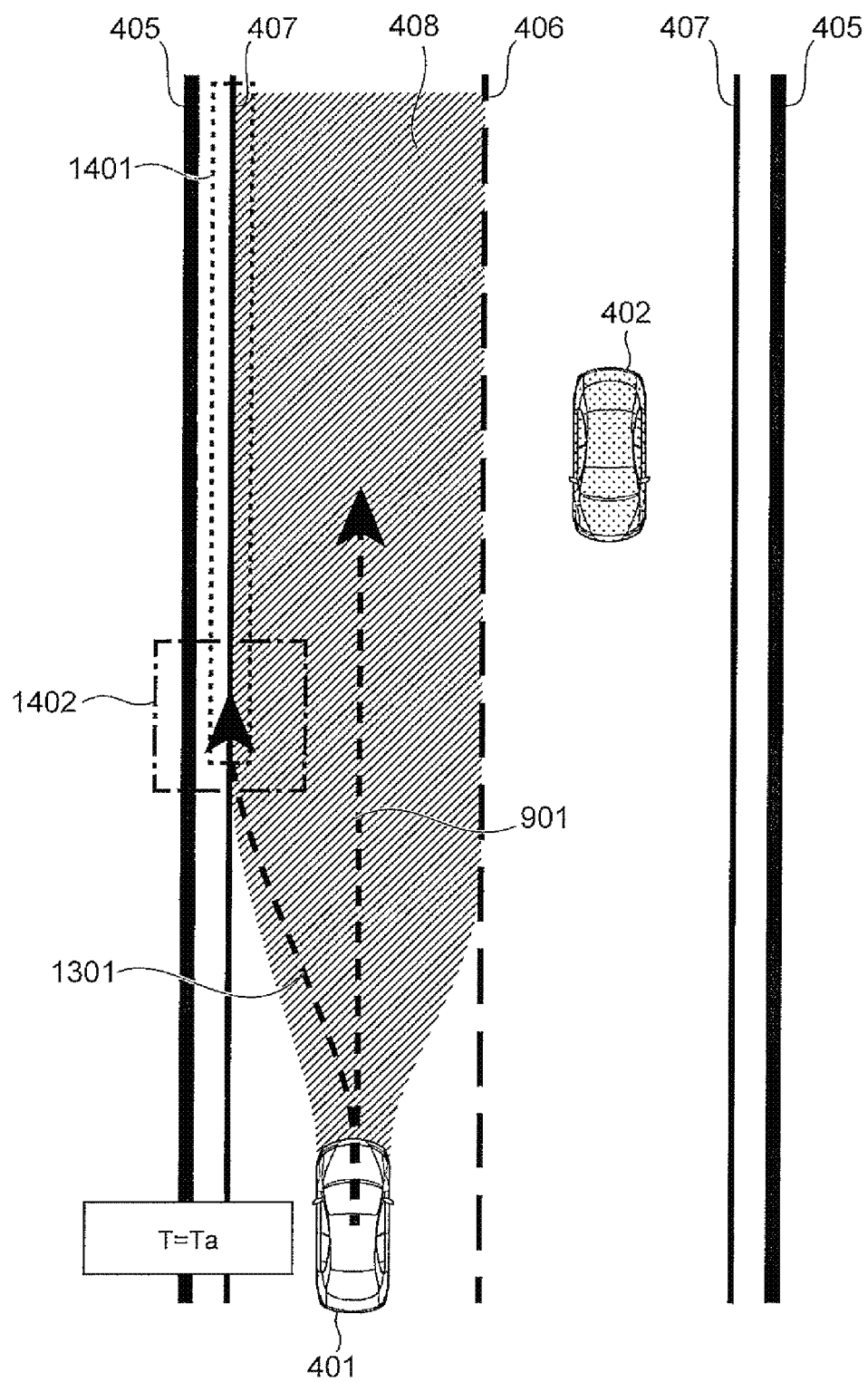
FIG. 19 is an explanatory diagram illustrating a relationship between the track-at-the-time-of-failure to the evacuation space when a failure occurs and the normal target track.
Figure 20:
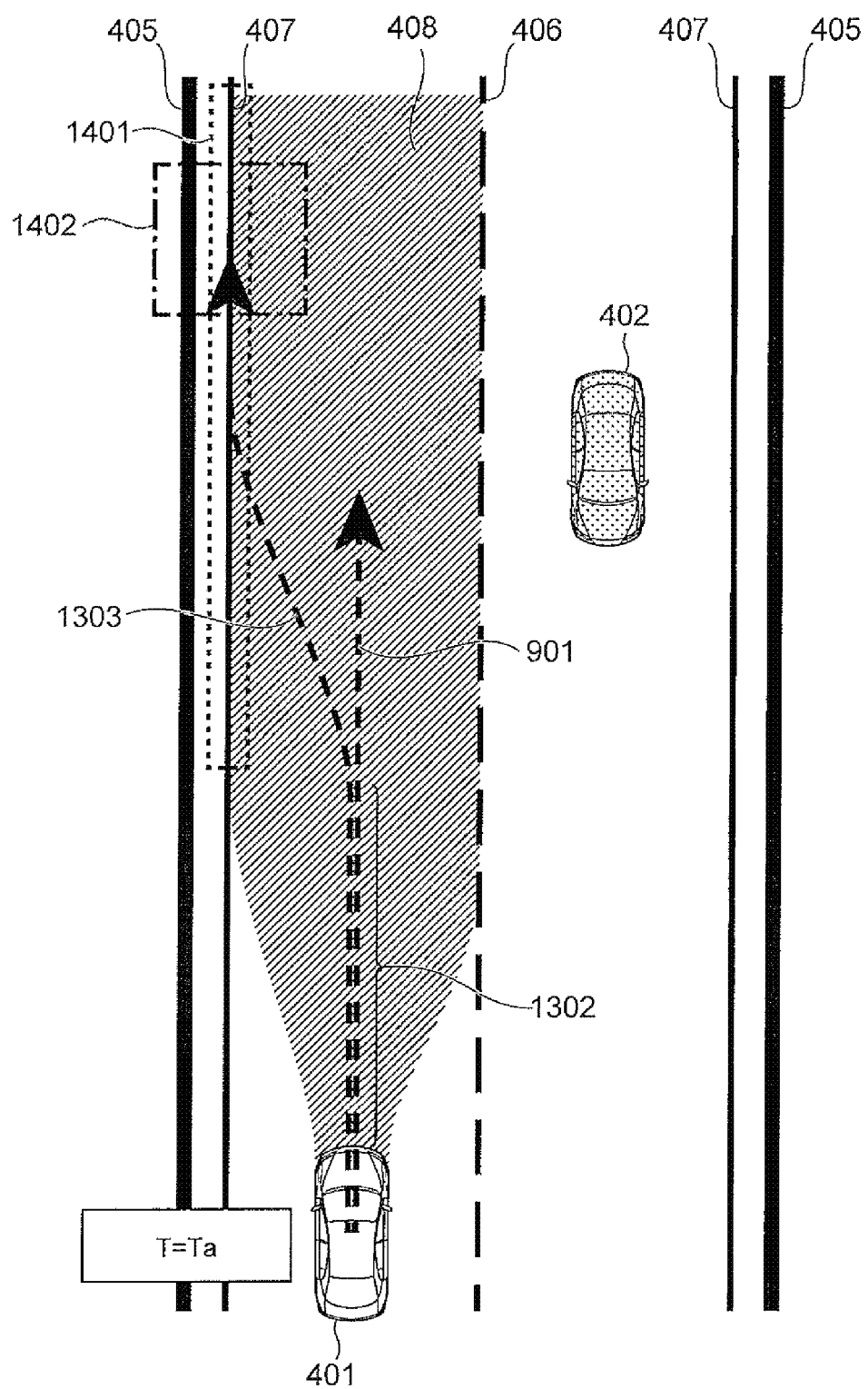
FIG. 20 is an explanatory diagram showing the relationship between a track-at-the-time-of-failure and a normal target track to the evacuation space when the failure occurs.

In the scene illustrated in FIG. 17, when a failure is detected at time Ta, it is conceivable that only the automatic driving planning unit 201 or the automatic parking planning unit 202 can make an emergency stop, but as described above, by generating the track-at-the-time-of-failure (in other words, generating the track-at-the-time-of-failure) based on the drivable area 408 in the vehicle motion control unit 203, the vehicle 401 can be safely stopped at the road end. In addition, the driver alarm unit 1603 issues an alarm to the driver without making an emergency stop, so that the driver can take over the driving more safely.

As described above, also in the second embodiment, as in the first embodiment described above, since the frequency of acceleration/deceleration of the own vehicle is reduced by stabilizing track follow-up control of the own vehicle, it is possible to prevent the riding comfort from deteriorating. In addition, by mounting the automatic driving system on a plurality of controllers, even if the failure occurs in one controller, the other controllers can safely drive (travel/stop).

Note that the present invention is not limited to the above-described embodiments, but includes various modified examples. For example, the above-described embodiments are described in detail for the purpose of easy explanation of the present invention, and are not necessarily limited to those having all the configurations described above. In addition, some of components of a certain embodiment can be replaced by components of another embodiment, and components of another embodiment can also be added to components of a certain embodiment. In addition, it is possible to add, delete, and replace other components with respect to some of the components of the respective embodiments.

In addition, each of the above-described configurations, functions, processing units, and processing means may be implemented in hardware by designing some or all of them in, for example, an integration circuit. In addition, each of the above-described configurations and functions may be implemented in software by interpreting and executing a program that implements the respective functions of the processor. Information such as programs, tables, and files that perform each function can be stored in a memory, a hard disk, a storage device such as a solid state drive (SSD), or a recording medium such as an IC card, an SD card, or a DVD.

In addition, control lines and information lines indicate what is considered necessary for explanation, and not necessarily all the control lines and information lines on the product. In practice, it can be considered that almost all configurations are connected to each other.

REFERENCE SIGNS LIST 1 vehicle control device
2 to 5 sensor 8 steering control device
15 braking control device
19 acceleration control device
23 communication device
24 display device
201 automatic driving planning unit (driving plan calculation unit)
202 automatic parking planning unit (driving plan calculation unit)
203 vehicle motion control unit
204 actuator control unit
205 in-vehicle network
301 radar
302 stereo camera
303 vehicle sensor
304 LIDAR
305 sensor information processing unit
306 map information processing unit
307 three-dimensional object behavior prediction unit
308 storage unit
309 drivable area calculation unit
401 own vehicle (automatic driving vehicle)
402 another vehicle
403 three-dimensional object (falling object)
404 predicted track information of another vehicle
405 fence
406 road center line
407 road end point sequence
408 drivable area
409 non-drivable area
601 track candidate generation unit
602 track evaluation unit
603 target track determination unit
604 track follow-up control command value calculation unit
701 route candidate generation unit
702 velocity candidate generation unit
901 target track
1301 track-at-the-time-of-failure (evacuation track)
1401 connecting road end information
1402 evacuation space
1501 failure detection unit
1502 track-at-the-time-of-failure generation unit
1600 evacuation space calculation unit
1601 route-at-the time-of-failure generation unit
1602 failure velocity generation unit
1603 driver alarm unit

The invention claimed is:

1. A vehicle control device comprising:
a sensor that measures a driving environment around a vehicle;
a memory: and
a processor communicatively coupled to the sensor and the memory, wherein the processor is configured to:
calculate a drivable area, which is a space in which the vehicle is safely drivable, based on information from the sensor and a destination of the vehicle,
calculate a target track including a route and a velocity satisfying a predetermined riding comfort condition in the drivable area and controls the vehicle so as to follow the target track,
regenerate the target track when the target track deviates from the predetermined riding comfort condition while driving the vehicle, and
set a reconnection point on the target track before regeneration based on a current vehicle position and the target track before the target track is regenerated, and
regenerates the target track so as to connect the current vehicle position to the target track before the target track is regenerated at the reconnection point, wherein the reconnection point is set to increase a connection distance between the vehicle and the reconnection point as a product of a separation amount between the vehicle and the target track before the target track is regenerated and the velocity of the vehicle increases.

2. The vehicle control device according to claim 1, wherein the predetermined riding comfort condition includes a linear sum of a square of an acceleration of the vehicle and a square of a jerk.

3. The vehicle control device according to claim 1 wherein the processor is further configured to:
regenerate the target track so that slopes of tangents at the reconnection point of the target track before the target track is regenerated and the target track after regeneration match.

4. The vehicle control device according to claim 1, wherein the processor is further configured to:
calculate a track-at-the-time-of-failure that safely stops the vehicle by using the drivable area and road end information received before a failure occurs while driving the vehicle and it becomes impossible to receive the drivable area.

5. The vehicle control device according to claim 4, wherein the processor is further configured to:
calculate an evacuation space larger than a vehicle size based on the drivable area before the failure occurs, and calculate the track-at-the-time-of-failure based on the evacuation space.

6. The vehicle control device according to claim 4, wherein the road end information is obtained from the position of the vehicle and map information stored in the memory or a stereo camera attached to the vehicle.

7. The vehicle control device according to claim 5, wherein the processor is further configured to:
issue an alarm prompting a driver to stop the vehicle by driver manipulation when the track-at-the-time-of-failure generation unit does not detect the evacuation space.

8. The vehicle control device according to claim 5, wherein the processor is further configured to:
monitor a driver state and determine whether or not driving can be taken over within a predetermined time, and
generate the track-at-the-time-of-failure so as to evacuate to the evacuation space after traveling on the target track for the predetermined time.

9. The vehicle control device according to claim 4, wherein the processor is further configured to:
determine that a failure has occurred when the drivable area has not been updated for a predetermined time.

10. The vehicle control device according to claim 1, wherein the processor includes a first processor and a second processor that are mounted on different controllers.

* * * * *